(12) United States Patent
Utsuno et al.

(10) Patent No.: US 11,355,780 B2
(45) Date of Patent: Jun. 7, 2022

(54) SULFIDE SOLID ELECTROLYTE PARTICLES

(71) Applicant: IDEMITSU KOSAN CO., LTD., Chiyoda-ku (JP)

(72) Inventors: Futoshi Utsuno, Sodegaura (JP); Toshiaki Tsuno, Sodegaura (JP); Kota Terai, Sodegaura (JP); Hironari Kimpara, Sodegaura (JP); Atsushi Sato, Sodegaura (JP)

(73) Assignee: IDEMITSU KOSAN CO., LTD., Chiyoda-ku (JP)

( * ) Notice: Subject to any disclaimer, the term of this patent is extended or adjusted under 35 U.S.C. 154(b) by 332 days.

(21) Appl. No.: 16/491,659

(22) PCT Filed: Mar. 8, 2018

(86) PCT No.: PCT/JP2018/008976
§ 371 (c)(1),
(2) Date: Sep. 6, 2019

(87) PCT Pub. No.: WO2018/164224
PCT Pub. Date: Sep. 13, 2018

(65) Prior Publication Data
US 2020/0006808 A1    Jan. 2, 2020

(30) Foreign Application Priority Data
Mar. 8, 2017    (JP) .............................. JP2017-044312

(51) Int. Cl.
*H01M 4/02* (2006.01)
*H01M 10/0562* (2010.01)
(Continued)

(52) U.S. Cl.
CPC ......... *H01M 10/0562* (2013.01); *C01B 17/22* (2013.01); *H01B 1/10* (2013.01);
(Continued)

(58) Field of Classification Search
CPC ....................................................... H01M 4/02
See application file for complete search history.

(56) References Cited

U.S. PATENT DOCUMENTS

2010/0290969 A1   11/2010   Deiseroth et al.
2013/0040208 A1    2/2013   Kanno et al.
(Continued)

FOREIGN PATENT DOCUMENTS

JP    5-306117 A      11/1993
JP    2010-540396 A   12/2010
(Continued)

OTHER PUBLICATIONS

English translation of the International Search Report dated May 22, 2018 in PCT/JP2018/008976, citing documents AA-AC and AI-AS therein, 2 pages.
(Continued)

*Primary Examiner* — Jacob B Marks
(74) *Attorney, Agent, or Firm* — Oblon, McClelland, Maier & Neustadt, L.L.P.

(57) ABSTRACT

A sulfide solid electrolyte particles comprising lithium, phosphorus and sulfur, having a volume-based average particle size measured by laser diffraction particle size distribution measurement of 0.1 μm to 10 μm, having a diffraction peak having 2θ of 29.0 to 31.0 deg in powder X-ray diffraction measurement using CuKα ray, and an intensity ratio (Ib/Ip) of a peak intensity Ib at a high angle-side low part of the diffraction peak to a peak intensity Ip of the diffraction peak is less than 0.09.

15 Claims, 6 Drawing Sheets

(51) Int. Cl.
*C01B 17/22* (2006.01)
*H01B 1/10* (2006.01)
*H01M 4/13* (2010.01)
*H01M 4/62* (2006.01)
*H01M 10/0525* (2010.01)

(52) U.S. Cl.
CPC .............. *H01M 4/13* (2013.01); *H01M 4/62* (2013.01); *H01M 10/0525* (2013.01); *C01P 2002/30* (2013.01); *C01P 2002/72* (2013.01); *C01P 2002/86* (2013.01); *C01P 2004/51* (2013.01)

(56) References Cited

U.S. PATENT DOCUMENTS

| | | |
|---|---|---|
| 2015/0333367 A1 | 11/2015 | Kato et al. |
| 2016/0156064 A1 | 6/2016 | Miyashita et al. |
| 2017/0155170 A1* | 6/2017 | Sato .......................... C03C 4/18 |
| 2017/0222257 A1* | 8/2017 | Miyashita ................ C01B 25/14 |
| 2017/0229732 A1* | 8/2017 | Kanno ................. H01M 10/058 |
| 2017/0352916 A1 | 12/2017 | Miyashita et al. |

FOREIGN PATENT DOCUMENTS

| | | | |
|---|---|---|---|
| JP | 2011-124081 A | | 6/2011 |
| JP | 2013-33659 | * | 2/2013 |
| JP | 2013-33659 A | | 2/2013 |
| JP | 2013-41749 A | | 2/2013 |
| JP | 2014-102987 A | | 6/2014 |
| JP | 2014-130733 A | | 7/2014 |
| JP | 2015-220015 A | | 12/2015 |
| JP | 2016-24874 A | | 2/2016 |
| JP | 2016-207354 A | | 12/2016 |
| JP | WO 2018/047566 A1 | | 3/2018 |
| WO | WO 2011/118801 A1 | | 9/2011 |
| WO | WO 2015/011937 A1 | | 1/2015 |
| WO | WO 2015/012042 A1 | | 1/2015 |
| WO | WO 2016/104702 A1 | | 6/2016 |

OTHER PUBLICATIONS

English translation of the International Preliminary Report on Patentability and Written Opinion of the International Searching Authority dated Sep. 19, 2019 in PCT/JP2018/008976 filed Mar. 8, 2018, citing documents AA-AC and AI-AR therein 9 pages.

Yuki Kato, et al., "High-Power All-Solid-State Batteries Using Sulfide Superionic Conductors" Nature Energy, Mar. 21, 2016, p. 1-7.

* cited by examiner

SULFIDE SOLID ELECTROLYTE PARTICLES

TECHNICAL FIELD

The present invention relates to sulfide solid electrolyte particles.

BACKGROUND ART

With the rapid spread of information-related devices and communication devices such as personal computers, video cameras, mobile phones in recent years, the development of batteries used as power sources thereof has been emphasized. Among the batteries, lithium ion batteries are attracting attention from the viewpoint of high energy density.

A liquid electrolyte comprising a flammable organic solvent is used in conventional lithium-ion batteries currently on the market. Therefore, conventional lithium-ion batteries need attachment of a safety device which suppresses a temperature rise during a short circuit, and improvements in structure and material to prevent a short circuit. In contrast, a solid-state lithium ion battery which is totally solidified by changing a liquid electrolyte to a solid electrolyte does not use a flammable organic solvent therein, and therefore allows simplification of a safety device, and is considered advantageous in terms of producing cost and productivity.

A sulfide solid electrolyte is known as a solid electrolyte used in a lithium-ion battery. While there are various known crystal structures of sulfide solid electrolytes, a stable crystal structure which is difficult to change in structure in a wide temperature range is suitable from the perspective of widening the use temperature area of a battery. In addition, there is a demand for a material having a high ionic conductivity. As such a sulfide solid electrolyte, for example, a sulfide solid electrolyte having an argyrodite type crystal structure (for example, see Patent Documents 1 to 5) and a sulfide solid electrolyte having an LGPS-type crystal structure (for example, see Patent Document 6 and Non-Patent Document 1) have been developed.

RELATED ART DOCUMENTS

Patent Documents

Patent Document 1: JP 2010-540396 A
Patent Document 2: WO 2015/011937
Patent Document 3: WO 2015/012042
Patent Document 4: JP 2016-24874 A
Patent Document 5: WO 2016/104702
Patent Document 6: WO 2011/118801

Non-Patent Document

Non-Patent Document 1: Nature energy 30, 1-5 (2016) Yuki Kato et. al.

SUMMARY OF INVENTION

Sulfide solid electrolytes having a crystal structure of a stable phase, such as an argyrodite-type crystal structure or an LGPS-type crystal structure, require firing at a high temperature (e.g., 550° C.) at the time of producing. In general, it is considered that firing at a high temperature promotes particle growth and increases particle size.

On the other hand, from the viewpoint of the performance and production of the all-solid-state lithium ion battery, it is desirable that the particle size of the sulfide solid electrolyte is small. However, the inventors have found a problem that when a sulfide solid electrolyte having a crystal structure of a stable phase is particulated by grinding or the like, although the particle size is reduced, the ionic conductivity may be remarkably lowered.

It is an object of the present invention to provide sulfide solid electrolyte particles having a crystal structure of a stable phase, a small particle size, and a high ionic conductivity. It is another object of the present invention to provide a producing method thereof.

As a result of intensive research, the present inventors have found that when a sulfide solid electrolyte having a crystal structure of a stable phase is pulverized by grinding or the like, the powder X-ray diffraction pattern of the sulfide solid electrolyte changes before and after the pulverization. Then, when the intensity ratio (Ib/Ip) of an peak intensity Ib at a high angle-side low part of the diffraction peak to a peak intensity Ip of the diffraction peak within the range of $2\theta=29.0$ to 31.0 deg is less than 0.09, it has been found that a sulfide solid electrolyte particles having a small particle size and a high ionic conductivity can be obtained, and the present inventors have completed the present invention.

According to an embodiment of the present invention, solid electrolyte sulfide particles containing lithium, phosphorus, and sulfur, having a volume-based average particle size measured by laser diffraction particle size distribution measurement of 0.1 μm or more and 10 μm or less, having a diffraction peak having 2θ ranging from 29.0 to 31.0 deg in powder X-ray diffraction measurement using CuKα ray, and having an intensity ratio (Ib/Ip) of the peak intensity Ib at a high angle-side low part of the diffraction peak to a peak intensity Ip of the diffraction peak of less than 0.09 is provided.

According to an embodiment of the present invention, sulfide solid electrolyte particles containing lithium, phosphorus, and sulfur, having a volume-based average particle size measured by laser diffraction particle size distribution measurement of 0.1 μm or more and 10 μm or less, and an ionic conductivity of 4.0 mS/cm or more is provided.

According to an embodiment of the present invention, a method for producing sulfide solid electrolyte particles comprising a crystal structure of a stable phase, wherein the sulfide solid electrolyte is particulated and then the particulated material is heat treated is provided.

According to an embodiment of the present invention, an electrode mix containing the sulfide solid electrolyte particles and an active material is provided.

According to an embodiment of the present invention, a lithium ion battery containing at least one of the sulfide solid electrolyte particles and the electrode mix is provided.

According to an embodiment of the present invention, sulfide solid electrolyte particles having a crystal structure of a stable phase and having a small particle size and a high ionic conductivity can be provided.

MODE FOR CARRYING OUT INVENTION

Figure 1:
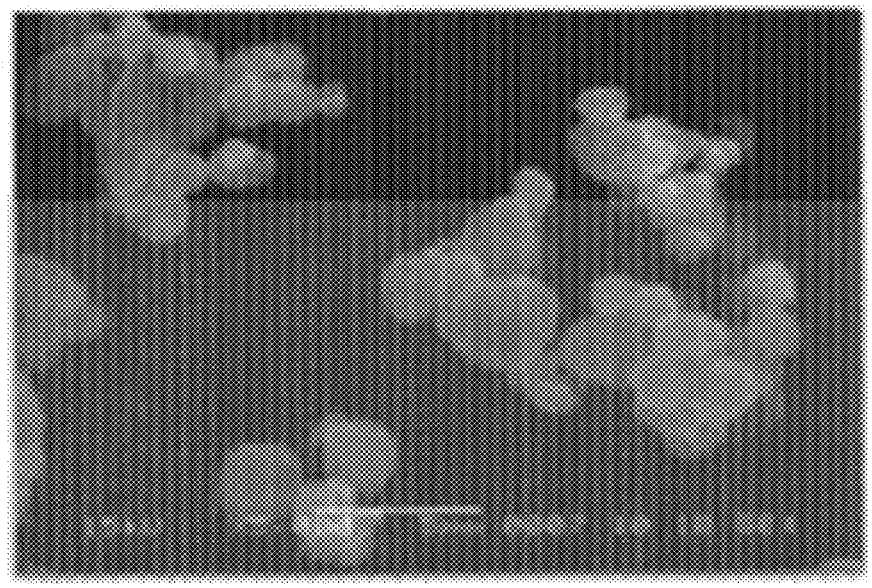
FIG. 1 is an electron micrograph of a sulfide solid electrolyte particle produced in Example 1.

The sulfide solid electrolyte particles of one embodiment of the invention contain lithium, phosphorus, and sulfur, and have a volume-based average particle size ($D_{50}$) of 0.1 μm or more and 10 μm or less as measured by laser diffraction particle size distribution measurements. In powder X-ray diffraction measurement using CuKα ray, the sulfide solid electrolyte particles have a diffraction peak within the range of 2θ=29.0 to 31.0 deg, and the intensity ratio (Ib/Ip) of the peak intensity Ib at a high angle-side low part of the diffraction peak to the peak intensity Ip of the diffraction peak is less than 0.09.

In the present embodiment, since the Ib/Ip is less than 0.09, the ionic conductivity is increased even though the $D_{50}$ is as small as 0.1 μm or more and 10 μm or less.

The intensity ratio is preferably 0.08 or less, more preferably 0.07 or less. The intensity ratio is preferably 0, but may be 0.001 or more, or 0.005 or more.

The $D_{50}$ of the sulfide solid electrolyte particles is preferably 0.2 μm or more and 8 μm or less, more preferably 0.3 μm or more and 6 μm or less.

The peak intensity Ip is a height of a diffraction peak (hereinafter referred to as a diffraction peak A) having a peak top within a range of 2θ=29.0 to 31.0 deg in powder X-ray diffraction measurement using CuKα ray. When there are two or more diffraction peaks in the above range, the strongest diffraction peak is defined as the diffraction peak A. The diffraction peak A is a peak caused by the crystal structure of the stable phase contained in the sulfide solid electrolyte particles.

The diffraction intensity Ib is the diffraction intensity at a high angle-side low part of the peak having the peak intensity Ip. Specifically, the diffraction intensity Ib is the diffraction intensity which is larger than the angle of the peak top of the diffraction peak A and is the diffraction intensity at the minimum angle at which the differential value becomes 0 in the differential curve obtained by differentiating the periphery of the region including the diffraction peak A after smoothing the X-ray diffraction pattern obtained by powder X-ray diffraction measurement.

When the diffraction intensity Ib is strong, the ionic conductivity of the sulfide solid electrolyte particles is lowered. The present inventors presume that the diffraction intensity Ib is an intensity of a broad peak (halo pattern) caused by an amorphous component, and the strong diffraction intensity Ib indicates that glass is generated in the surface layer of the sulfide solid electrolyte particle.

In the present embodiment, since the diffraction peak A caused by the crystal structure contained in the sulfide solid electrolyte particle and the halo pattern caused by the amorphous component overlap, both are separated using the above-described differential curve.

Details of methods for measuring volume-based average particle size ($D_{50}$) and powder X-ray diffractometry are given in the Examples.

The crystal structure of the stable phase is generally a crystal structure in which the free energy is thermodynamically low under certain external conditions such as pressure and temperature. In the present application, the crystal structure of the stable phase means a crystal structure which exists without causing a structural change in a temperature range including room temperature, for example, 300° C. or lower. For example, when heat treatment is performed at 300° C. for 10 hours in a tube sealed in an argon atmosphere at room temperature and atmospheric pressure, it can be confirmed that a diffraction peak which does not change in X-ray diffraction analysis before and after the heat treatment (within a measurement error range) is derived from a crystal structure of a stable phase.

The crystal structure of the stable phase includes, for example, an argyrodite-type crystal structure and an LGPS-type crystal structure.

As an argyrodite-type crystal structure, for example, the crystal structures disclosed in Angew. Chem Vol. 47 (2008), No. 4, p. 755-758; Phys. Status. Solidi Vol. 208 (2011), No. 8, P. 1804-1807; Solid State Ionics Vol. 221 (2012) P. 1-5; Patent Documents 1 to 5, JP 2011-096630 A, and JP 2013-211171 A can be given.

The LGPS-type crystal structure is a $Li_{4-x}Ge_{1-x}P_xS_4$ (x is 0<x<1) based thio-LISICON Region II crystal structure or a crystal structure similar to the type. For example, there is a crystal structure disclosed in Patent Document 6 and Non-Patent Document 1.

The sulfide solid electrolyte particles of the present embodiment preferably contain an argyrodite-type crystal structure as the crystal structure of the stable phase. In this case, the diffraction peak A appears at 2θ=29.7±0.5 deg.

Diffraction peaks of the argyrodite-type crystal structure may appear, for example, at 2θ=25.2±0.5 deg, and may also appear at 2θ=15.3±0.5 deg, 17.7±0.5 deg, 31.1±0.5 deg, 44.9±0.5 deg, and 47.7±0.5 deg. The sulfide solid electrolyte particles of this embodiment may have these peaks.

The sulfide solid electrolyte particles of the present embodiment preferably contain an LGPS-type crystal structure as the crystal structure of the stable phase. In this case, the diffraction peak A appears at 2θ=29.6±0.5 deg.

Diffraction peaks of LGPS-type crystal structures may appear, for example, at 2θ=20.2±0.5 deg. For example, in $Li_{10}GeP_2S_{12}$, diffraction peaks of LGPS-type crystal structures appear at 2θ=12.4±0.5 deg, 2θ=14.4±0.5 deg, 17.4±0.5 deg, 20.2±0.5 deg, 23.9±0.5 deg, 26.9±0.5 deg, 29.6±0.5 deg, 41.5±0.5 deg, and 47.4±0.5 deg.

In the present application, the position of the diffraction peak is determined by Y±0.5 deg when the median value is Y, but Y±0.3 deg is preferable. For example, in the case of the above-mentioned diffraction peak of 2θ=29.7±0.5 deg, the median value Y is 29.7 deg, and it is preferable that the peak exists in the range of 2θ=29.7±0.3 deg. The same can be applied to judgement of all of the other diffraction peak positions in the invention.

The sulfide solid electrolyte particle of the present embodiment may further contain halogen in addition to the elements of lithium, phosphorus, and sulfur. Examples of the halogen include fluorine (F), chlorine (Cl), bromine (Br), iodine (I), and the like. The sulfide solid electrolyte particle of the present embodiment preferably contains Cl. It is also preferable to contain both Cl and Br.

In the sulfide solid electrolyte particles containing halogen, the molar ratio X/S of halogen to sulfur is preferably greater than 0.23 and less than 0.57. By including the argyrodite-type crystal structure and setting the molar ratio of halogen to sulfur in the above range, the ionic conductivity of the sulfide solid electrolyte particles is increased. The molar ratio (X/S) is preferably 0.25 or more and 0.43 or less, more preferably 0.30 or more and 0.41 or less. In the present embodiment, the sulfide solid electrolyte particles preferably contain two or more types of halogens.

The sulfide solid electrolyte particles of the present embodiment preferably have an area ratio of the glass-derived peak to a total area of all peaks at 60 to 120 ppm, which is observed in solid $^{31}$P-NMR measurement, of 0% or more and 30% or less. The area ratio of the glass-derived peak is more preferably 20% or less, and more preferably 10% or less. In the range of 60 to 120 ppm, peaks originating from the crystal structure of the stable phase and peaks originating from the glass are observed.

Identification of crystalline structures and glasses by solid $^{31}$P-NMR measurement and the area of each peak are calculated by separating signals observed at 60 to 120 ppm of the spectra obtained by solid $^{31}$P-NMR measurement into each peak by a nonlinear least squares method and measuring the area of each peak.

Chemical shifts of sulfide solid electrolytes obtained by solid $^{31}$P-NMR measurements are changed not only by their chemical structures but also by the arrangement state of atoms, the coordination numbers and coordination state of surrounding atoms, and the like. Also, since averaging of chemical shifts due to molecular motion does not occur in crystals and glasses, spectrum corresponding to all of these structures are observed. That is, in the crystal, even in the same chemical structure, a plurality of sharp peaks is observed reflecting a difference in the environment based on the symmetry and a difference in the coordination state of the surrounding atoms. On the other hand, in the glass, a large number of peaks having different chemical shifts are observed to overlap to reflect the disturbance of the local structure, and as a result, a broad peak is observed at a position corresponding to each chemical structure.

For example, the argyrodite-type crystal structure and the LGPS-type crystal structure each contain a $PS_4^{3-}$ structure in the crystal, but the chemical shifting positions of peaks obtained by solid $^{31}$P-NMR measurements differ in the respective crystal structures due to differences in the symmetries of the crystals and differences in the coordination states of atoms around the $PS_4^{3-}$ structure. On the other hand, a glass composed of a $PS_4^{3-}$ structure, a $P_2S_7^{4-}$ structure, and a $P_2S_6^{4-}$ structure has been reported as a sulfide solid electrolyte in a glass state, and the chemical shifts of these chemical structures are observed at positions different from the chemical shift positions of the peaks of the above-mentioned crystals, or the half-value widths are greatly different from each other.

By utilizing the above-mentioned difference, in a sulfide solid electrolyte in which crystal and glass coexist, the solid $^{31}$P-NMR spectrum can be separated into peaks from crystal and peaks from glass, and the respective amounts can be quantified. Details will be described in the following Examples. Each peak area indicates the amount of phosphorus present in the same surrounding environment.

When the sulfide solid electrolyte particles of the present embodiment are in an aspect including an argyrodite-type crystal structure, it is preferable that the molar ratio a (Li/P) of lithium to phosphorus, the molar ratio b (S/P) of sulfur to phosphorus, and the molar ratio c (X/P) of one or more elements X selected from the group consisting of chalcogens excluding sulfur and halogens to phosphorus satisfy the following formulae (A) to (C):

$$5.0 \leq a \leq 7.5 \quad (A)$$

$$6.5 \leq a+c \leq 7.5 \quad (B)$$

$$0.5 \leq a-b \leq 1.5 \quad (C)$$

wherein in the formulae, b>0 and c≥0.

Examples of the chalcogen excluding sulfur include oxygen (O), selenium (Se), tellurium (Te), and the like.

Examples of the halogen include F, Cl, Br, and I.

In the above formula (B), $6.6 \leq a+c < 7.1$ is preferable, and $6.8 \leq a+c < 7.1$ is more preferable.

In the above formula (C), $1.0 < a-b \leq 1.4$ is preferable, and $1.0 < a-b \leq 1.3$ is more preferable.

In the present application, the molar ratio and composition of each element in the sulfide solid electrolyte particles are the values determined by the ICP luminescence analysis method, except for special circumstances such as difficulty in analysis. The method for measuring by ICP luminescence analysis is described in the Examples.

The molar ratio of each element can be controlled by adjusting the content of each element in the raw material.

When the sulfide solid electrolyte particles of the present embodiment contain the element X, the smaller the ionic radius of the element X, the more the element X contained in the argyrodite-type crystal structure, and the higher the ionic conductivity, so that the molar ratio a of lithium to phosphorus is preferably adjusted by the ionic radius of the element X. The element X can be classified into the following three groups ($X_1$, $X_2$ and $X_3$) depending on the size of the ion radii.

$X_1$: F, Cl, O
$X_2$: Br
$X_3$: I, Se, Te

When the molar ratio occupied by the element $X_1$ in the element X is the largest, the above formula (A) is preferably $5.2 \leq a \leq 6.5$, and more preferably $5.25 \leq a \leq 6.4$. When the molar ratio occupied by the element $X_2$ in the element X is the largest, the above formula (A) is preferably $5.2 \leq a \leq 6.8$, and more preferably $5.3 \leq a \leq 6.6$. When the molar ratio occupied by the element $X_3$ in the element X is the largest, the above formula (A) is preferably $5.5 \leq a \leq 7.0$, and more preferably $5.5 \leq a \leq 6.8$.

The element X is preferably composed of only halogen.

The phosphorus is an element constituting the skeleton structure of the sulfide solid electrolyte particles.

The sulfide solid electrolyte particles of the present embodiment may contain elements such as Si, Ge, Sn, Pb, B, Al, Ga, As, Sb, Bi, in addition to the above-mentioned lithium, phosphorus, sulfur, and element X. When the sulfide solid electrolyte particles contain one or more elements M selected from the group consisting of Si, Ge, Sn, Pb, B, Al, Ga, As, Sb, and Bi, the molar ratio of each element in the above (A) to (C) is a molar ratio to the total of the elements M and phosphorus. For example, the molar ratio a (Li/P) of lithium to phosphorus is Li/(P+M).

The sulfide solid electrolyte particles of the present embodiment preferably satisfy, for example, the composition represented by the following formula (1).

$$Li_a(P_{1-\alpha}M_\alpha)S_bX_c \quad (1)$$

wherein in the formula (1), M is one or more elements selected from the group consisting of Si, Ge, Sn, Pb, B, Al, Ga, As, Sb, and Bi, X is one or more elements selected from the group consisting of F, Cl, Br, I, O, Se, and Te; a to c satisfy the formulas (A) to (C); and $\alpha$ is $0 \leq \alpha \leq 0.3$.)

When c in the formula (1) is not 0 and the molar ratio occupied by the element $X_1$ to the whole X is the largest, a is preferably $5.2 \leq a \leq 6.5$, and more preferably $5.25 \leq a \leq 6.4$. When the molar ratio occupied by the element $X_2$ is the largest, a is preferably $5.2 \leq a \leq 6.8$, and more preferably $5.3 \leq a \leq 6.6$. When the molar ratio occupied by the element $X_3$ is the largest, a is preferably $5.5 \leq a \leq 7.0$, and more preferably $5.5 \leq a \leq 6.8$.

X in the formula (1) is preferably one or more halogens selected from F, Cl, Br and I. It is also preferable that X in the formula (1) is two or more elements selected from the group consisting of F, Cl, Br, and I ($x_1, \ldots, x_n$: n is an integer of 2 or more and 4 or less). The incorporation of halogen into the argyrodite-type crystal structure increases the ionic conductivity. X is preferably composed of two kinds of elements ($x_1, x_2$) or three kinds of elements ($x_1, x_2, x_3$), and is more preferably composed of two kinds of elements. When two or more halogens are contained, the molar ratio of the respective elements is not particularly limited, but when chlorine is contained, the molar ratio ($X_{Cl}$) of chlorine to element X preferably satisfies $0.25 < X_{Cl} < 1$.

$\alpha$ is preferably 0.

The sulfide solid electrolyte particles of one embodiment of the present invention can have a high ionic conductivity of 4.0 mS/cm or more even though the sulfide solid electrolyte particles are fine particles of $D_{50}$ being 0.1 μm or more and 10 μm or less. The ionic conductivity is preferably 5.0 mS/cm or more, more preferably 7.0 mS/cm or more, and most preferably 9.0 mS/cm or more.

The sulfide solid electrolyte particles of the present embodiment can be produced by, for example, particulating the sulfide solid electrolyte and then heat-treating the particulated material.

The method for producing the sulfide solid electrolyte is not particularly limited. For example, reference can be made to the literature on the argyrodite-type crystal structure or the LGPS-type crystal structure described above. The sulfide solid electrolyte before particulation may be a sulfide solid electrolyte having a same or similar crystal structure to that of the sulfide solid electrolyte particles obtained by particulation. Alternatively, a sulfide solid electrolyte (intermediate) having a crystal structure of sulfide solid electrolyte particles by heat treatment after particulation may be used.

The intermediate is preferably produced, for example, by applying mechanical stress to a raw material containing lithium, phosphorus and sulfur.

The sulfide solid electrolyte is, for example, particulated by a pulverizing apparatus such as a jet mill, and then heat-treated.

Hereinafter, an embodiment of the producing method of the present invention will be described.

One embodiment of the producing method of the present invention includes a step of preparing a sulfide solid electrolyte (intermediate) by applying mechanical stress to a raw material containing lithium, phosphorus, and sulfur, particulating the obtained intermediate into intermediate particles, and heat treating the intermediate particles.

The raw material used is a combination of one type of compound containing elements that the sulfide solid electrolyte particles to be produced contain as essential elements, i.e., lithium, phosphorus, and sulfur, or two or more types of compound containing lithium, phosphorus, and sulfur as a whole, or a simple substance.

As the material containing lithium, for example, a lithium compound such as lithium sulfide ($Li_2S$), lithium oxide ($Li_2O$), or lithium carbonate ($Li_2CO_3$), a simple substance of lithium metals, or the like can be given. Among them, a lithium compound is preferable, and lithium sulfide is more preferable.

The lithium sulfide can be used without any particular limitation, but a lithium sulfide having a high purity is preferable. Lithium sulfide can be produced, for example, by the method described in JP-H07-330312 A, JP-H09-283156 A, JP 2010-163356 A, and JP 2011-84438 A.

Specifically, lithium hydroxide and hydrogen sulfide are reacted in a hydrocarbon-based organic solvent at 70° C. to 300° C. to form lithium hydrosulfide, and subsequently, hydrogen sulfide is removed from this reaction liquid, thereby to produce lithium sulfide (JP 2010-163356 A).

Further, by reacting lithium hydroxide and hydrogen sulfide in an aqueous solvent at 10° C. to 100° C. to form lithium hydrosulfide, and subsequently, hydrogen sulfide is removed from this reaction liquid, thereby to produce lithium sulfide (JP 2011-84438 A).

Examples of the raw material containing phosphorus include phosphorus sulfide such as diphosphorus trisulfide ($P_2S_3$) and diphosphorus pentasulfide ($P_2S_5$) and, phosphorus compounds such as sodium phosphate ($Na_3PO_4$) and, and phosphorus alone. Among these, phosphorus sulfide is preferable, and diphosphorus pentasulfide ($P_2S_5$) is more preferable. Phosphorus compounds such as diphosphorus pentasulfide ($P_2S_5$) and phosphorus alone can be used without particular limitation as long as they are produced and sold industrially.

When the sulfide solid electrolyte particle contains an element X such as halogen, the raw material preferably contains, for example, a halogen compound represented by the following formula (2).

$$M_lX_m \quad (2)$$

In the formula (2), M represents sodium (Na), lithium (Li), boron (B), aluminum (Al), silicon (Si), phosphorus (P), sulfur (S), germanium (Ge), arsenic (As), selenium (Se), tin (Sn), antimony (Sb), tellurium (Te), lead (Pb), bismuth (Bi), or a combination of these elements with an oxygen element or a sulfur element, and Li or P is preferable and Li is more preferable.

X is a halogen selected from the group consisting of F, Cl, Br, and I.

Moreover, l is an integer of 1 or 2, and m is an integer of 1 to 10. When m is an integer of 2 to 10, that is, when a plurality of Xs presents, Xs may be the same or different. For example, in the case of $SiBrCl_3$ mentioned later, m is 4, and Xs are different elements, i.e. Br and Cl.

Specific examples of the halogen compound represented by the above formula (2) include sodium halide such as NaI, NaF, NaCl, and NaBr; lithium halide such as LiF, LiCl, LiBr, and LiI; boron halide such as $BCl_3$, $BBr_3$, and $BI_3$; aluminum halide such as $AlF_3$, $AlBr_3$, $AlI_3$, and $AlCl_3$; silicon halide such as $SiF_4$, $SiCl_4$, $SiCl_3$, $Si_2Cl_6$, $SiBr_4$, $SiBrCl_3$, $SiBr_2Cl_2$, and $SiI_4$; phosphorus halide such as $PF_3$, $PF_5$, $PCl_3$, $PCl_5$, $POCl_3$, $PBr_3$, $POBr_3$, $PI_3$, $P_2Cl_4$, and $P_2I_4$; sulfur halide such as $SF_2$, $SF_4$, $SF_6$, $S_2F_{10}$, $SCl_2$, $S_2Cl_2$, and $S_2Br_2$; germanium halide such as $GeF_4$, $GeCl_4$, $GeBr_4$, $GeI_4$, $GeF_2$, $GeCl_2$, $GeBr_2$, and $GeI_2$; arsenic halide such as $AsF_3$, $AsCl_3$, $AsBr_3$, $AsI_3$, and $AsF_5$; selenium halide such as $SeF_4$, $SeF_6$, $SeCl_2$, $SeCl_4$, $Se_2Br_2$, and $SeBr_4$; tin halide such as $SnF_4$, $SnCl_4$, $SnBr_4$, $SnI_4$, $SnF_2$, $SnCl_2$, $SnBr_2$, and $SnI_2$; antimony halide such as $SbF_3$, $SbCl_3$, $SbBr_3$, $SbI_3$, $SbF_5$, and $SbCl_5$; tellurium halide such as $TeF_4$, $Te_2F_{10}$, $TeF_6$, $TeCl_2$, $TeCl_4$, $TeBr_2$, $TeBr_4$, and $TeI_4$; lead halide such as $PbF_4$, $PbCl_4$, $PbF_2$, $PbCl_2$, $PbBr_2$, and $PbI_2$; and bismuth halide such as $BiF_3$, $BiCl_3$, $BiBr_3$, and $BiI_3$.

Among these, lithium halides such as lithium chloride (LiCl), lithium bromide (LiBr), and lithium iodide (LiI); and phosphorus halide such as phosphorus pentachloride ($PCl_5$), phosphorus trichloride ($PCl_3$), phosphorus pentabromide ($PBr_5$), phosphorus tribromide ($PBr_3$) are preferable. Among them, lithium halide such as LiCl and LiBr and LiI; and $PBr_3$ are preferable; and lithium halide such as LiCl, LiBr and LiI are more preferable; and LiCl and LiBr are still more preferable.

One of the kinds of halogen compounds described above may be used alone, or a combination of two or more kinds may be used.

In the present embodiment, it is preferable that the lithium compound, the phosphorus compound, and the halogen compound are included, and at least one of the lithium compound and the phosphorus compound includes sulfur, the combination of lithium sulfide, phosphorus sulfide, and lithium halide is more preferable, and the combination of lithium sulfide, diphosphorus pentasulfide, and lithium halide is still more preferable.

In the present embodiment, it is preferable to react the above-mentioned raw material by applying mechanical stress to form a sulfide solid electrolyte (intermediate). Herein, "applying mechanical stress" is to mechanically apply shear stress, impact force, or the like. As the means for applying mechanical stress, for example, a pulverizer such as a planetary ball mill, a vibration mill, or a rolling mill; a kneader, or the like can be given.

In the present embodiment, it is preferable to react the raw material by applying mechanical stress to form a glassy sulfide solid electrolyte (intermediate). That is, the raw material powder is pulverized and mixed to a state in which crystallinity cannot be maintained by a mechanical stress that is stronger than that of the prior art. Thus, it is estimated that the sulfide solid electrolyte particles of the present invention exhibit high ionic conductivity.

For example, when a vibration mill is used as the pulverizer, the raw material may be processed at a rotation speed of 1000 to 2000 revolutions per second for 24 to 168 hours.

For example, when a ball made of zirconia is used as the pulverization media, its diameter is preferably 0.2 to 20 mm.

The intermediate produced by applying mechanical stress is particulated into intermediate particles. Examples of the particulating means include a jet mill, a ball mill, and a bead mill. Whether the particulating process is dry or wet is not limited, but from the viewpoint of, for example, reducing drying processes, the particulating process is preferably a dry particulating process.

The conditions of the atomization can be appropriately adjusted in consideration of the device to be used, the conditions of the intermediates, and the like. The $D_{50}$ of the obtained intermediate particles is preferably 0.1 to 10 μm, more preferably 0.5 to 5 μm.

The resulting intermediate particles are heat treated to produce sulfide solid electrolyte particles. The conditions of the heat treatment can be appropriately set so as to obtain a desired crystal structure of a stable phase. For example, the heat treatment temperature is preferably 350° C. to 700° C.

Specifically, in the case of an argyrodite-type crystal structure, the heat treatment temperature is preferably 350 to 650° C., more preferably 360 to 500° C., and still more preferably 380 to 450° C. The heat treatment time may be adjusted depending on the temperature, for example, 0.5 to 48 hours is preferable, and 1 to 10 hours is more preferable.

In the present embodiment, it is preferable that the intermediate particles contain two or more halogens, for example, Cl and Br. When the intermediate particles contain two or more halogens, sulfide solid electrolyte particles having a small $D_{50}$ and a high ionic conductivity may be obtained even if the heat treatment temperature is lowered or the treatment time is shortened as compared with the case where the intermediate particles contain only one kind of halogen.

In the case of the LGPS-type crystal structure, the heat treatment temperature is preferably 400 to 700° C., more preferably 450 to 650° C., and still more preferably 500 to 600° C. The heat treatment time may be adjusted depending on the temperature, for example, 0.5 to 100 hours is preferable, and 1 to 48 hours is more preferable.

For example, when lithium sulfide, diphosphorus pentasulfide, and lithium halide is used as the raw material of the sulfide solid electrolyte particles of the present embodiment, and sulfide solid electrolyte particles including an argyrodite-type crystal structure are produced, the molar ratio of the input raw material can be lithium sulfide:diphosphorus pentasulfide:lithium halide=37 to 88:8 to 25:0.1 to 50.

Although an embodiment of the producing method of the present invention has been described above, the producing method of the present invention is not limited to the present embodiment. For example, in the present embodiment, the intermediate particles are heat-treated to produce the sulfide solid electrolyte particles, but the sulfide solid electrolyte particles may be produced by heat-treating the particulated sulfide solid electrolyte instead of the intermediate particles. The sulfide solid electrolyte can be produced, for example, by heat-treating the sulfide solid electrolyte (intermediate) described above.

The sulfide solid electrolyte particles of the invention can be used in a solid electrolyte layer, a positive electrode, a negative electrode, etc. of a lithium ion secondary battery.

[Electrode Mix]

The electrode mix of the embodiment of the present invention includes the sulfide solid electrolyte partides of the present invention described above and an active material. Alternatively, the electrode mix is produced by the sulfide solid electrolyte particles of the present invention. When a negative electrode active material is used as the active material, the electrode mix becomes a negative electrode mix. On the other hand, when a positive electrode active material is used, the electrode mix becomes a positive electrode mix.

Negative Electrode Mix

A negative electrode mix is obtained by incorporating a negative electrode active material to the sulfide solid electrolyte particles of the invention.

As the negative electrode active material, for example, a carbon material, a metal material, or the like can be used. A complex composed of two or more of these can also be used. Further, a negative electrode active material that will be developed in the future can be used.

It is preferred that the negative electrode active material has electron conductivity.

The carbon materials include graphite (e.g., artificial graphite), graphite carbon fiber, resin calcined carbon, pyrolytic vapor-grown carbon, coke, mesocarbon microbeads (MCMB), burned carbon of furfuryl alcohol resin, polyacene, pitch-based carbon fibers, vapor grown carbon fibers, natural graphite, non-graphitizable carbon and the like can be given.

Examples of the metallic material include a simple metal substance, alloys, and metal compounds. Examples of the metal simple substance include metallic silicon, metallic tin, metallic lithium, metallic indium, and metallic aluminum. Examples of the alloy include an alloy containing at least one of silicon, tin, lithium, indium, and aluminum. Examples of the metal compound include a metal oxide. The metal oxide is, for example, silicon oxide, tin oxide or aluminum oxide.

The blending ratio of the negative electrode active material and the sulfide solid electrolyte particles is preferably 95% by weight:5% by weight to 5% by weight:95% by weight, more preferably 90% by weight:10% by weight to 10% by weight:90% by weight, and still more preferably 85% by weight:15% by weight to 15% by weight:85% by weight.

When the content of the negative electrode active material in the negative electrode mix is too small, the electric capacity becomes small. Further, when the negative electrode active material has electron conductivity and does not contain a conductive aid, or contains only a small amount of a conductive aid, it is considered that the electron conductivity (electron conduction path) in the negative electrode may be lowered to decrease the rate characteristic, or the utilization rate of the negative electrode active material may be lowered to decrease the electric capacity. On the other hand, when the content of the negative electrode active material in the negative electrode mix is too large, it is considered that the ionic conductivity (ion conduction path) in the negative electrode may be lowered to decrease the rate characteristics, or the utilization factor of the negative electrode active material may be lowered to decrease the electronic capacity.

The negative electrode mix may further contain a conductive aid.

When the electron conductivity of the negative electrode active material is low, it is preferable to add a conductive aid. The conductive aid may have conductivity, and its electronic conductivity is preferably $1 \times 10^3$ S/cm or more, more preferably $1 \times 10^5$ S/cm or more.

Specific examples of the conductive aid include a substance containing at least one element selected from the group consisting of carbon material, nickel, copper, aluminum, indium, silver, cobalt, magnesium, lithium, chromium, gold, ruthenium, platinum, beryllium, iridium, molybdenum, niobium, osmium, rhodium, tungsten, and zinc, and more preferably, a carbon material such as carbon with high conductivity or carbon material other than carbon simple substance, and a metal simple substance, mixture or compound containing nickel, copper, silver, cobalt, magnesium, lithium, ruthenium, gold, platinum, niobium, osmium, or rhodium.

Specific examples of carbon material include carbon black such as Ketjenblack, acetylene black, Dencablack, thermal black, channel black, and the like; graphite, carbon fiber, activated carbon, and the like, which can be used alone or in combination with two or more species. Among them, acetylene black, Dencablack, and Ketjenblack having high electron conductivity are preferable.

When the negative electrode mix contains a conductive aid, the content of the conductive aid in the mixture is preferably 1 to 40% by weight, more preferably 2 to 20% by weight. It is considered that when the content of the conductive aid is too small, the electronic conductivity of the negative electrode may be lowered to decrease the rate characteristic, or the utilization rate of the negative electrode active material may be lowered to decrease the electric capacity. On the other hand, when the content of the conductive auxiliary agent is too large, the amount of the negative electrode active material and/or the amount of the sulfide solid electrolyte particles becomes small. It is presumed that when the amount of the negative electrode active material decreases, the electric capacity decreases. In addition, it is considered that when the amount of the sulfide solid electrolyte particles is reduced, the ionic conductivity of the negative electrode may be lowered to decrease the rate characteristic, or the utilization rate of the negative electrode active material may be lowered to decrease the electric capacity.

The negative electrode mix may further contain a binder in order to bind the negative electrode active material and the sulfide solid electrolyte particles tightly to each other.

As the binder, fluorine-containing resins such as polytetrafluoroethylene (PTFE), polyvinylidene fluoride (PVDF), and fluorine rubber; thermoplastic resins such as polypropylene and polyethylene; ethylene-propylene-diene rubber (EPDM), sulfonated EPDM, natural butyl rubber (NBR), and the like can be used alone or as mixtures of two or more kinds. In addition, an aqueous dispersion of cellulose or styrene butadiene rubber (SBR), which is an aqueous binder, can be used.

The negative electrode mix can be produced by mixing the sulfide solid electrolyte particles, the negative electrode active material, and an arbitrary conductive aid and/or binder.

The mixing method is not particularly limited; for example, a dry mixing using a mortar, a ball mill, a bead mill, a jet mill, a planetary ball mill, a vibrating ball mill, a sand mill, a cutter mill; and an wet mixing using a mortar, a ball mill, a bead mill, a planetary ball mill, a vibration ball mill, a sand mill, a fill mix after dispersing the raw material in an organic solvent, and then removing the solvent can be applied. Among them, wet mixing is preferable in order not to destroy the negative electrode active material particles.

Positive Electrode Mix

By blending the positive electrode active material into the sulfide solid electrolyte particles of the present invention, a positive electrode mix is obtained.

The positive electrode active material is a material capable of intercalating and desorbing lithium ions, and a material known as a positive electrode active material in the field of batteries can be used. Further, a positive electrode active material to be developed in the future can also be used.

Examples of the positive electrode active material include metal oxides, sulfides, and the like. Sulfides include metal sulfides and non-metal sulfides.

The metal oxide is, for example, a transition metal oxide. More specifically, $V_2O_5$, $V_6O_{13}$, $LiCoO_2$, $LiNiO_2$, $LiMnO_2$, $LiMn_2O_4$, $Li(Ni_aCo_bMn_c)O_2$ (where $0<a<1$, $0<b<1$, $0<c<1$, $a+b+c=1$), $LiNi_{1-Y}Co_YO_2$, $LiCo_{1-Y}Mn_YO_2$, $LiNi_{1-Y}Mn_YO_2$ (where $0 \leq Y<1$), $Li(Ni_aCo_bMn_c)O_4$ ($0<a<2$, $0<b<2$, $0<c<2$, $a+b+c=2$), $LiMn_{2-Z}Ni_ZO_4$, $LiMn_{2-Z}Co_ZO_4$ (where $0<Z<2$), $LiCoPO_4$, $LiFePO_4$, $CuO$, $Li(Ni_aCo_bAl_c)O_2$ (where $0<a<1$, $0<b<1$, $0<c<1$, $a+b+c=1$), and the like are mentioned.

Examples of the metal sulfide include titanium sulfide ($TiS_2$), molybdenum sulfide ($MoS_2$), iron sulfide (FeS, $FeS_2$), copper sulfide (CuS), nickel sulfide ($Ni_3S_2$), and the like.

Others of the metallic oxide include bismuth oxide ($Bi_2O_3$), bismuth lead oxide ($Bi_2Pb_2O_5$), and the like.

Examples of nonmetallic sulfides include organic disulfide compounds and carbon sulfide compounds.

In addition to those mentioned above, niobium selenide ($NbSe_3$), metallic indium, sulfur can also be used as the positive electrode active material.

The positive electrode mix may further comprise a conductive aid.

The conductive aid is the same as that of the negative electrode mix.

The mixing ratio of the sulfide solid electrolyte particles and the positive electrode active material of the positive electrode mix, the content of the conductive aid, and the producing method of the positive electrode mix are the same as those of the negative electrode mix described above.

[Lithium Ion Battery]

The lithium ion battery of the embodiment of the present invention includes at least one of the sulfide solid electrolyte particles and the electrode mix of the present invention described above. Alternatively, it is produced by at least one of the sulfide solid electrolyte particles and the electrode mix of the present invention.

The constituent of the lithium ion battery is not particularly limited, but generally has a structure in which a negative electrode layer, an electrolyte layer, and a positive electrode layer are stacked in this order. Hereinafter, each layer of the lithium ion battery will be described.

(1) Negative Electrode Layer

The negative electrode layer is preferably a layer that is produced from the negative electrode mix of the invention.

Alternatively, the negative electrode layer is a layer that comprises the negative electrode mix of the invention.

The thickness of the negative electrode layer is preferably 100 nm or more and 5 mm or less, more preferably 1 μm or more and 3 mm or less, and still more preferably 5 μm or more and 1 mm or less.

The negative electrode layer can be produced by a known method. For example, it can be produced by a coating method, an electrostatic method (electrostatic spray method, electrostatic screen method, etc.).

(2) Negative Electrolyte Layer

The electrolyte layer is a layer containing a solid electrolyte or a layer made from a solid electrolyte. The solid electrolyte is not particularly limited, but is preferably a sulfide solid electrolyte particle of the present invention.

The electrolyte layer may consist of a solid electrolyte and may further comprise a binder. As the binder, the same binder as the binder of the negative electrode mix of the present invention can be used.

The thickness of the electrolyte layer is preferably 0.001 mm or more and 1 mm or less.

The solid electrolyte of the electrolyte layer may be fused. Fusion means that a part of the solid electrolyte particles dissolve and the dissolved part integrates with other solid electrolyte particles. Further, the electrolyte layer may be a plate-like body of the solid electrolyte, and as for the plate-like body, there may be cases where part or all of the solid electrolyte particles are dissolved to form a plate-like body.

The electrolyte layer can be produced by a known method, for example, a coating method or an electrostatic method (electrostatic spray method, electrostatic screen method, etc.).

(3) Positive Electrode Layer

The positive electrode layer is a layer that comprises a positive electrode active material. Preferably, the positive electrode layer is a layer that comprises the positive electrode mix of the invention or a layer produced from the positive electrode mix of the invention.

The thickness of the positive electrode layer is preferably 0.01 mm or more and 10 mm or less.

The positive electrode layer can be produced by a known method. For example, it can be produced by a coating method, an electrostatic method (electrostatic spray method, electrostatic screen method, etc.).

(4) Current Collector

The lithium ion battery of the present embodiment preferably further comprises a current collector. For example, the negative electrode current collector is provided on the side opposite to the electrolyte layer side of the negative electrode layer, and the positive electrode current collector is provided on the side opposite to the electrolyte layer side of the positive electrode layer.

As the current collector, a plate-like body or a foil-like body, etc. formed of copper, magnesium, stainless steel, titanium, iron, cobalt, nickel, zinc, aluminum, germanium, indium, lithium or an alloy thereof, or the like.

The lithium ion battery of the present embodiment can be produced by attaching and jointing the above-described members. As a method of jointing, there are a method of laminating each member, pressing and crimping the members, a method of pressing through between two rolls (roll to roll), and the like.

Jointing may be conducted with an active material having an ionic conductivity or an adhesive material that does not impair ionic conductivity on the jointing surface.

In the jointing, heat sealing may be conducted within a range that the crystal structure of the solid electrolyte is not changed.

The lithium ion battery of the present embodiment can also be produced by sequentially forming the above-described members. It can be produced by a known method, for example, by a coating method, an electrostatic method (electrostatic spray method, electrostatic screen method, or the like).

EXAMPLES

The present invention is described below in more detail by Examples.

The evaluation method is as follows.

(1) Volume-Based Average Particle Size ($D_{50}$)

A measurement was performed with a laser diffraction/scattering type particle size distribution measurement device (manufactured by HORIBA, LA-950V2 model LA-950W2).

A mixture of dehydrated toluene (manufactured by Wako Pure Chemical Industries, Ltd., Special Grade) and tertiary butyl alcohol (manufactured by Wako Pure Chemical Industries, Ltd., Special Grade) at a weight ratio of 93.8:6.2 was used as a disperse medium. 50 mL of the disperse medium was poured into a flow cell of the device, and circulated. Thereafter, an object to be measured was added to the disperse medium, a resulting product was ultrasonically treated, and then particle size distribution was measured. The addition amount of the object to be measured was adjusted so that red light transmittance (R) was within 80 to 90% and blue light transmittance (B) was within 70 to 90%, which are corresponding to particle concentration, in a measurement screen defined by the device. The calculation conditions were 2.16 as the value of the refractive index of the object to be measured and 1.49 as the value of the refractive index of the dispersion medium. In the setting of the distribution form, the particle size calculation was performed by fixing the number of repetitions to 15 times.

(2) Ionic Conductivity Measurement

The sulfide solid electrolyte particles produced in each example were filled in a tablet molding machine, and a pressure of 22 MPa was applied to form a molded body. Carbon was placed on both sides of the molded body as an electrode, and pressure was applied again by a tablet molding machine, whereby a molded body for measurement (diameter: about 10 mm, thickness: 0.1 to 0.2 cm) was produced. The ionic conductivity of this molded body was measured by AC impedance measurement. The conductivity values at 25° C. were adopted.

(3) X-Ray Diffraction (XRD) Measurement

Circular pellets having a diameter of 10 mm and a height of 0.1 to 0.3 cm were molded from the sulfide solid electrolyte particles produced in each Example to obtain samples. The samples were measured without exposure to air using an XRD airtight holder. The 2θ position of the diffraction peak was determined by the centroid method using an XRD analysis program JADE.

Measurement was conducted under the following conditions using a powder X-ray diffractometer SmartLab manufactured by Rigaku Corporation.

Tube voltage: 45 kV
Tube current: 200 mA
X-ray wavelength: Cu-Kα ray (1.5418 Å)
Optical system: Parallel beam system
Slit configuration: Solar slit 5°, incident slit: 1 mm, light receiving slit: 1 mm
Detector: Scintillation counter
Measurement range: 2θ=10-60 deg
Step width, Scan speed: 0.02 deg, 1 deg/min In the analysis of the peak position for confirming the existence of the crystal structure from the measurement result, the peak position was obtained by drawing the baseline by cubic approximation using the XRD analysis program JADE.

The peak-intensity ratios were calculated from the measured results using Excel spreadsheet software. Firstly, a weighted average of 7 points was averaged, and the averaged value was averaged again by a weighted average of 7 points, and then this average value was averaged by a weighted average of 7 points, thereby smoothed. Using the smoothed points, a differential curve was generated using the difference between adjacent smoothed points as a differential value.

The maximum value of the measured intensity in the range where 2θ is 29.0 to 31.0 deg was defined as the peak intensity Ip of the peak A. The measured intensity of the angle at a point where the value of the differential curve becomes 0 (a point where the value changes from positive (plus) to negative (minus)) in the wide-angle region from the maximum intensity is defined as Ib. The Ib/Ip was calculated from these values.

(4) ICP Measurement

The sulfide solid electrolyte particles produced in each Example were weighed, and collected in a vial in an argon atmosphere. A KOH alkaline aqueous solution was placed in a vial, and the sample was dissolved while taking care to the collection of the sulfur content, and the solution was appropriately diluted and used as a measurement solution. This solution was measured with a Paschen-Runge type ICP-OES apparatus (SPECTRO ARCOS manufactured by SPECTRO), and the composition was determined.

A calibration solution for Li, P and S was prepared by using a 1000 mg/L standard solution for ICP measurement, and a calibration solution for Cl and Br was prepared by using a 1000 mg/L standard solution for ion chromatography.

Two measurement solutions were prepared for each sample, and five measurements were performed for each measurement solution to calculate an average value. The composition was determined by averaging the measured values of the two measurement solutions.

(5) Solid $^{31}$P-NMR Measurements

Approximately 60 mg of powder sample was loaded into an NMR-sample tube and solid $^{31}$P-NMR spectrum was obtained using the equipment and conditions described below.

Apparatus: ECZ 400 R apparatus (manufactured by JEOL Ltd.)
Observation nucleus: $^{31}$P
Observation frequency: 161.944 MHz
Measurement temperature: Room temperature
Pulse sequence: Single pulse (using 90° pulse)
90° pulse width: 3.8μ
Waiting time after FID measurement until the next pulse application: 300 s
Rotational speed of magic angle rotation: 12 kHz
Number of integrations: 16 times
Measurement range: 250 ppm to −150 ppm
Chemical Shift: Obtained by using $(NH_4)_2HPO_4$ (Chemical Shift 1.33 ppm) as an external reference.

Regarding the obtained solid $^{31}$P-NMR spectrum, the area ratio of the glass-derived peaks ($\varphi_{glass}$) was obtained by a method that differed depending on the type of the crystal structures.

(I) Argyrodite-Type Crystal Structure Containing Only Chlorine as a Halogen

The NMR signals ranging from 60 to 120 ppm in the solid $^{31}$P-NMR spectrum were separated into Gaussian function or Pseudo-Voigt function (linear sum of Gaussian and Lorentz functions) by the nonlinear least squares method to obtain each of the peaks. In the above ranges, in addition to the peak due to the argyrodite-type crystal structure containing chlorine, the peak due to the $Li_7PS_6$ crystal structure may be observed at 88.5 to 90.5 ppm and the peak due to the β crystal of the $Li_3PS_4$ crystal structure may be observed at 86 to 87.6 ppm. Therefore, waveforms were separated in different manners between the case where these two peaks were not observed and the case where they were observed.

(I-1) When Peaks Due to β Crystals of $Li_7PS_6$ Crystal Structure and $Li_3PS_4$ Crystal Structure are Not Observed NMR signals ranging from 60 to 120 ppm were separated into Gaussian function or Pseudo-Voigt function (linear sum of Gaussian and Lorentz functions) by the nonlinear least squares method to obtain six peaks having the positions of chemical shifts and the range of half-value widths shown in Table 1. From the sum of the areas of the peaks of the $P_4$ to $P_6$ assigned to the glass ($S_g=S_4+S_5+S_6$) and the sum of the areas of all peaks ($S_{all}=S_1+S_2+S_3+S_4+S_5+S_6$), the area ratio of the peaks derived from the glass ($\varphi_{glass}$) was calculated using the following formula.

$$\varphi_{glass}=100\times S_g/S_{all}$$

TABLE 1

|  | chemical shift (ppm) | half value width (Hz) | function used for the separation | area | assignment |
|---|---|---|---|---|---|
| 6th peak ($P_6$) | 102-108 | 900-1500 | Gaussian | $S_6$ | glass ($P_2S_6^{4-}$) |
| 5th peak ($P_5$) | 91.4 | 1380 | Gaussian | $S_5$ | glass ($P_2S_7^{4-}$) |
| 4th peak ($P_4$) | 82.5-84.5 | 900-1500 | Gaussian | $S_4$ | glass ($PS_4^{3-}$) |
| 3rd peak ($P_3$) | 84.0-85.6 | 150-800 | Pseudo-Voigt | $S_3$ | argyrodite crystal |
| 2nd peak ($P_2$) | 82.4-83.7 | 150-800 | Gaussian | $S_2$ | argyrodite crystal |
| 1st peak ($P_1$) | 80.3-81.7 | 150-500 | Pseudo-Voigt | $S_1$ | argyrodite crystal |

(I-2) When Peaks Due to $Li_7PS_6$ Crystal Structure or β Crystal of $Li_3PS_4$ Crystal Structure are Observed As shown in Table 2, NMR signals ranging from 60 to 120 ppm were separated into three peaks due to an argyrodite-type crystal structure, three peaks derived from glass, and peaks due to $Li_7PS_6$ (Peak I) or $Li_3PS_4$ (Peak II) using the nonlinear least squares method. From the sum of the areas of the peaks of the $P_4$ to $P_6$ assigned to the glass ($S_g = S_4 + S_5 + S_6$) and the sum of all the peak areas ($S_{all+b} = S_1 + S_2 + S_3 + S_4 + S_5 + S_6 + b_1 + b_2$), the area ratio of the glass-derived peaks ($\varphi_{glass}$) was calculated using the following formula.

$\varphi_{glass} = 100 \times S_g / S_{all+b}$

TABLE 2

|  | chemical shift (ppm) | half value width (Hz) | function used for the separation | area | assignment |
|---|---|---|---|---|---|
| 6th peak ($P_6$) | 102-108 | 900-1500 | Gaussian | $S_6$ | glass ($P_2S_6^{4-}$) |
| 5th peak ($P_5$) | 91.4 | 1380 | Gaussian | $S_5$ | glass ($P_2S_7^{4-}$) |
| 4th peak ($P_4$) | 82.5-84.5 | 900-1500 | Gaussian | $S_4$ | glass ($PS_4^{3-}$) |
| 3rd peak ($P_3$) | 84.0-85.6 | 150-800 | Pseudo-Voigt | $S_3$ | argyrodite crystal |
| 2nd peak ($P_2$) | 82.4-83.7 | 150-800 | Gaussian | $S_2$ | argyrodite crystal |
| 1st peak ($P_1$) | 80.3-81.7 | 150-500 | Pseudo-Voigt | $S_1$ | argyrodite crystal |
| peak I | 88.5-90.5 | 150-800 | Pseudo-Voigt | $b_1$ | $Li_7PS_6$ crystal |
| peak II | 86.0-87.6 | 150-500 | Pseudo-Voigt | $b_2$ | $Li_3PS_4$ (β crystal) |

(II) Argyrodite-Type Crystal Structure Containing Only Chlorine and Bromine as Halogens The NMR signals ranging from 60 to 120 ppm in the solid $^{31}$P-NMR spectrum were separated into Gaussian function or Pseudo-Voigt function (linear sum of Gaussian and Lorentz functions) by the nonlinear least squares method to obtain each of peaks. In the above ranges, in addition to the peak due to the argyrodite-type crystal structure, a peak due to the $Li_7PS_6$ crystal structure may be observed at 88.5 to 90.5 ppm, and a peak due to the β crystal of the $Li_3PS_4$ crystal structure may be observed at 86 to 87.6 ppm. Therefore, waveforms were separated in different manners between the case where these two peaks were not observed and the case where they were observed.

(II-1) When No Peaks Due to $Li_7PS_6$ Crystal Structure and β Crystals of $Li_3PS_4$ Crystal Structure are Observed NMR signals ranging from 60 to 120 ppm were separated into Gaussian function or Pseudo-Voigt function (linear sum of Gaussian and Lorentz functions) by the nonlinear least squares method to obtain seven peaks having the positions of chemical shifts and the range of half-value widths shown in Table 3. From the sum of the areas of the peaks of the $P_5$ to $P_7$ assigned to the glass ($S_g = S_5 + S_6 + S_7$) and the sum of the areas of all peaks ($S_{all} = S_1 + S_2 + S_3 + S_4 + S_5 + S_6 + S_7$), the area ratio of the peaks derived from the glass ($\varphi_{glass}$) was calculated using the following formula.

$\varphi_{glass} = 100 \times S_g / S_{all}$

TABLE 3

|  | chemical shift (ppm) | half value width (Hz) | function used for the separation | area | assignment |
|---|---|---|---|---|---|
| 7th peak ($P_7$) | 102-108 | 900-1500 | Gaussian | $S_7$ | glass ($P_2S_6^{4-}$) |
| 6th peak ($P_6$) | 91.4 | 1380 | Gaussian | $S_6$ | glass ($P_2S_7^{4-}$) |
| 5th peak ($P_5$) | 82.5-84.5 | 900-1500 | Gaussian | $S_5$ | glass ($PS_4^{3-}$) |
| 4th peak ($P_4$) | 87.2-89.4 | 300-600 | Pseudo-Voigt | $S_4$ | argyrodite crystal |
| 3rd peak ($P_3$) | 85.2-86.7 | 150-800 | Pseudo-Voigt | $S_3$ | argyrodite crystal |
| 2nd peak ($P_2$) | 83.2-84.7 | 150-440 | Gaussian | $S_2$ | argyrodite crystal |
| 1st peak ($P_1$) | 81.5-82.5 | 150-500 | Pseudo-Voigt | $S_1$ | argyrodite crystal |

(II-2) Peaks Due to $Li_7PS_6$-Type Crystal Structure or β Crystals of $Li_3PS_4$-Type Crystal Structure are Observed.

NMR signals ranging from 60 to 120 ppm were separated into seven peaks due to the argyrodite-type structures and glass components and peaks due to $Li_7PS_6$ (Peak I) or $Li_3PS_4$ (Peak II) shown in Table 4 using the nonlinear least squares method. From the sum of the areas of the $P_5$ to $P_7$ peaks assigned to the glass ($S_g=S_5+S_6+S_7$) and the sum of all the peak areas ($S_{all+b}=S_1+S_2+S_3+S_4+S_5+S_6+S_7+b_1+b_2$), the area ratio ($\varphi_{glass}$) of the glass-derived peaks ($\varphi_{glass}$) was calculated using the following formula:

$$\varphi_{glass}=100\times S_g/S_{all+b}$$

TABLE 4

| | chemical shift (ppm) | half value width (Hz) | function used for the separation | area | assignment |
|---|---|---|---|---|---|
| 7th peak ($P_7$) | 102-108 | 900-1500 | Gaussian | $S_7$ | glass ($P_2S_6^{4-}$) |
| 6th peak ($P_6$) | 91.4 | 1380 | Gaussian | $S_6$ | glass ($P_2S_7^{4-}$) |
| 5th peak ($P_5$) | 82.5-84.5 | 900-1500 | Gaussian | $S_5$ | glass ($PS_4^{3-}$) |
| 4th peak ($P_4$) | 87.2-89.4 | 300-600 | Pseudo-Voigt | $S_4$ | argyrodite crystal |
| 3rd peak ($P_3$) | 85.2-86.7 | 150-800 | Pseudo-Voigt | $S_3$ | argyrodite crystal |
| 2nd peak ($P_2$) | 83.2-84.7 | 150-440 | Gaussian | $S_2$ | argyrodite crystal |
| 1st peak ($P_1$) | 81.5-82.5 | 150-500 | Pseudo-Voigt | $S_1$ | argyrodite crystal |
| peak I | 88.5-90.5 | 150-800 | Pseudo-Voigt | $b_1$ | $Li_7PS_6$ crystal |
| peak II | 86.0-87.6 | 150-500 | Pseudo-Voigt | $b_2$ | $Li_3PS_4$ (β crystal) |

(III) LGPS-Type Crystal Structure

In addition to the two peaks assigned to the $PS_4^{3-}$ structure of the 4d site and 2b site of LGPS-type crystal structure, peaks due to $Li_4P_2S_6$ crystal structure, β-$Li_3PS_4$ crystal structure, and glass are observed by overlap in the solid $^{31}$P-NMR spectrum of the sulfide solid electrolyte containing the LGPS-type crystal structure. NMR signals in the range of 60-120 ppm were separated into Gaussian function and Pseudo-Voigt function (linear sum of Gaussian and Lorentz functions) using the nonlinear least squares method to obtain peaks having the positions of chemical shifts and the range of half-value widths shown in Table 5. The area ratio of the glass-derived peaks ($\varphi_{glass}$) were calculated from the sum of the areas of the $P_5$ to $P_7$ peaks of the glass ($S_g=S_5+S_6+S_7$) and the sum of the areas of all the peaks ($S_{all}=S_1+S_2+S_3+S_4+S_5+S_6+S_7$) using the following formula.

$$\varphi_{glass}=100\times S_g/S_{all}$$

TABLE 5

| | chemical shift (ppm) | half value width (Hz) | function used for the separation | area | assignment |
|---|---|---|---|---|---|
| 7th peak ($P_7$) | 102-108 | 900-1500 | Gaussian | $S_7$ | glass ($P_2S_6^{4-}$) |
| 6th peak ($P_6$) | 91.4 | 1380 | Gaussian | $S_6$ | glass ($P_2S_7^{4-}$) |
| 5th peak ($P_5$) | 82.5-84.5 | 900-1500 | Gaussian | $S_5$ | glass ($PS_4^{3-}$) |
| 4th peak ($P_4$) | 109-111 | 100-400 | Pseudo-Voigt | $S_4$ | $Li_4P_2S_6$ crystal |
| 3rd peak ($P_3$) | 93.5-95.0 | 200-500 | Pseudo-Voigt | $S_3$ | LGPS crystal (4d) |
| 2nd peak ($P_2$) | 86.0-87.6 | 150-500 | Pseudo-Voigt | $S_2$ | $Li_3PS_4$ (β crystal) |
| 1st peak ($P_1$) | 73.5-75.0 | 200-500 | Pseudo-Voigt | $S_1$ | LGPS crystal (2b) |

Production Example 1

(Production of Lithium Sulfide ($Li_2S$))

In a 500 mL-separable flask equipped with a stirrer, 200 g of LiOH anhydride (manufactured by Honjo Chemical Corporation) dried under an inert gas was prepared. The temperature was raised under a stream of nitrogen, and the internal temperature was maintained at 200° C. Nitrogen gas was switched to hydrogen sulfide gas (Sumitomo Seika Chemicals Company, Limited) at a flow rate of 500 mL/min, and lithium-hydroxide anhydride (LiOH) and hydrogen sulfide were reacted with each other.

Moisture generated by the reaction was condensed by a condenser and recovered. The reaction was carried out for 6 hours at which time 144 mL of water was recovered. The reaction was continued for an additional 3 hours, but no water generation was observed.

The product powder was collected and measured for purity and XRD. As a result, the purity was 98.5%, and the peak pattern of $Li_2S$ was confirmed by XRD.

Example 1

(1) Preparation of Sulfide Solid Electrolyte (Intermediate)

The $Li_2S$ produced in Production Example 1, diphosphorus pentasulfide ($P_2S_5$, manufactured by Sigma-Aldrich Co. LLC), and lithium chloride (LiCl, manufactured by Sigma-Aldrich Co. LLC) were mixed so that the molar ratio ($Li_2S$:$P_2S_5$:LiCl) was 19:5:16 to obtain a mixture of starting materials. 200 g of the mixture and 1780 g of 20 mm-diameter zirconia balls were placed in a container made of SUS (volume 6 L). The container was attached to a vibrating mill (MD-3, manufactured by Chuo Kakohki Co., Ltd.) and mechanical energy was added (mechanical milling treatment) to obtain a sulfide solid electrolyte (intermediate), a white-yellowish powder. The processing conditions of the vibration mill were 1500 revolutions per second and 120 hours at 40° C. under a nitrogen atmosphere having a dew point of −40° C. or less.

(2) Particulation of Intermediate 30 g of the above intermediate were particulated in a nitrogen-atmosphere glove box using a jet mill (NJ-50, manufactured by Aisin Nano Technologies, CO., LTD). The treatment condition was that treatment rate was 180 g/hour (treatment time: 10 minutes), nitrogen was used as the grinding gas, the input gas pressure was 2.0 MPa, and the grinding gas pressure was 2.0 MPa.

The volume-based average particle size ($D_{50}$) of the particulated intermediate was 2.7 μm.

(3) Production of Sulfide Solid Electrolyte Particles

Approximately 10 g of the intermediate particles produced in the above (2) were packed into a Tamman tube (manufactured by Tokyo Garasu Kikai Co., Ltd.) in a glove box under an Ar atmosphere, the opening of the Tamman tube was dosed with quartz wool, and sealed with an enclosed container made of SUS so as not to enter the atmosphere. The enclosed container was then placed in an electric furnace (FUW243PA, manufactured by Advantech Toyo Kaisha, Ltd.) and heat treated. Specifically, the temperature was raised from room temperature to 430° C. at 2.5° C./min, and held at 430° C. for 1 hour. Thereafter, it was gradually cooled to obtain sulfide solid electrolyte particles.

The $D_{50}$ of the sulfide solid electrolyte particles was 4.3 μm. The ionic conductivity (σ) was 9.1 mS/cm.

As a result of the composition analysis by ICP of the sulfide solid electrolyte particles, the ratio of each element (Li:P:S:Cl) was 43.5:8.1:35.5:12.9 (mol %)=5.4:1.0:4.4:1.6.

FIG. 1 shows an electron micrograph of a sulfide solid electrolyte particles.

Figure 2:
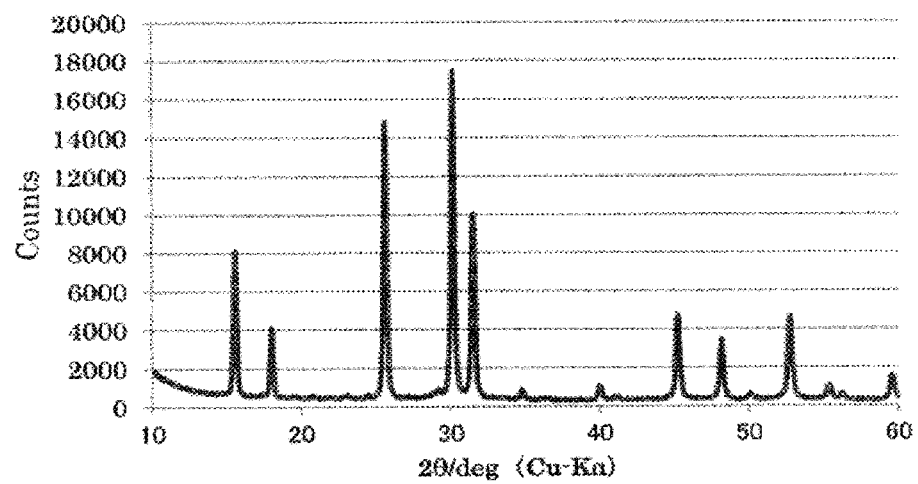
FIG. 2 is an X-ray diffraction (XRD) pattern of the sulfide solid electrolyte particles of Example 1.

The XRD pattern of the sulfide solid electrolyte particles is shown in FIG. 2. Peaks derived from the argyrodite-type crystal structure were observed at 2θ=15.56, 17.98, 25.62, 30.16, 31.52, 45.20, 48.10, and 52.70 deg. From FIG. 2, the peak intensity Ip of the diffraction peak A within the range of 2θ=29.0-31.0 deg was 17503 (2θ=30.16 deg).

Figure 3:
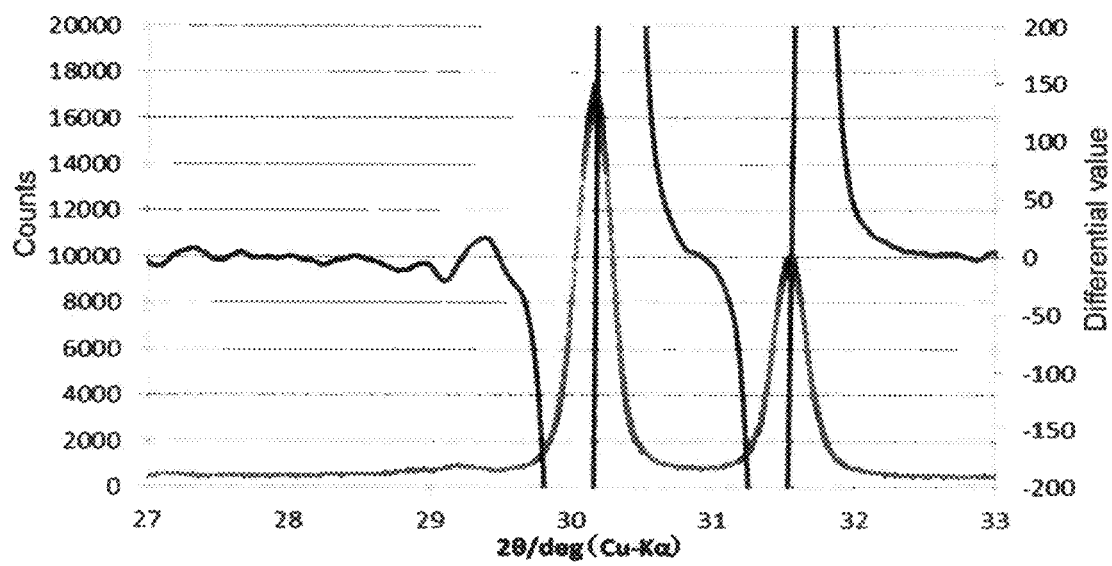
FIG. 3 is a view showing a differential curve of the XRD pattern in an enlarged view around $2\theta=27$ to 33 deg of the XRD pattern shown in FIG. 2.

FIG. 3 is a view showing a differential curve of the XRD pattern in an enlarged view of the XRD pattern around 2θ=27 to 33 deg shown in FIG. 2. From FIG. 3, the diffraction intensity Ib at a high angle-side low part of the diffraction peak A was 838 (2θ=30.94 deg).

Figure 4:
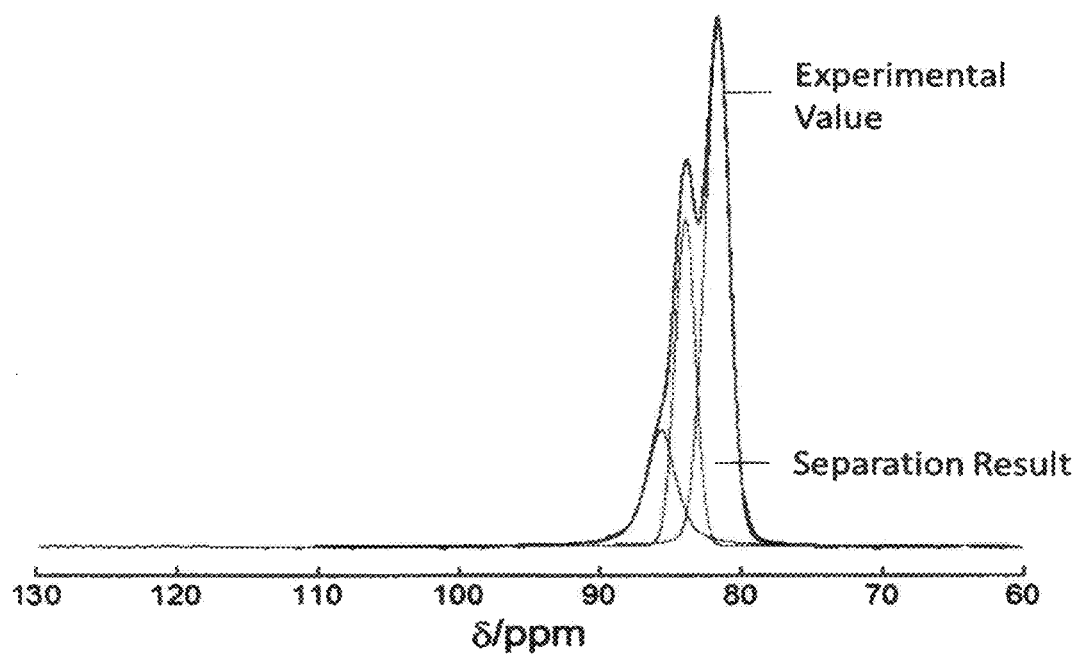
FIG. 4 is a solid $^{31}$P-NMR spectrum of the sulfide solid electrolyte particles of Example 1.

FIG. 4 shows the solid $^{31}$P-NMR spectrum of the sulfide solid electrolyte particles.

Table 6 shows the peak intensity Ip of the diffraction peak A, the diffraction intensity Ib at a high angle-side low part of the diffraction peak, the intensity ratio, and the ionic conductivity σ of the sulfide solid electrolyte particles produced in Example 1, and Examples 2 to 4 and Comparative Examples 1 to 3 described later. The area ratios of the peaks calculated from the solid $^{31}$P-NMR measurements of the sulfide solid electrolyte particles produced in Examples 1, 2A and Comparative Examples 1, 2 are shown in Table 7.

TABLE 6

| | XRD Intensity | | Intensity ratio | σ |
|---|---|---|---|---|
| | Ip (2θ:deg) | Ib (2θ:deg) | Ib/Ip | (mS/cm) |
| Ex. 1 | 17503 (30.16) | 838 (30.94) | 0.05 | 9.1 |
| Comp. Ex 1 | 12862 (30.16) | 1172 (30.94) | 0.09 | 1.4 |
| Ex. 2A | 11570 (30.12) | 669 (30.92) | 0.06 | 9.6 |
| Ex. 2B | 10103 (30.12) | 609 (30.92) | 0.06 | 6.1 |
| Ex. 3A | 12802 (30.06) | 491 (30.98) | 0.04 | 10.1 |
| Ex. 3B | 13271 (30.10) | 794 (30.90) | 0.06 | 10.3 |
| Comp. Ex. 2 | 7015 (30.16) | 1829 (30.88) | 0.26 | 2.8 |
| Ex. 4 | 12113 (29.48) | 537 (30.66) | 0.04 | 6.8 |
| Comp. Ex. 3 | 2685 (29.04) | 1339 (30.78) | 0.50 | 1.4 |

TABLE 7

| | area ratio of peaks (%) | | | |
|---|---|---|---|---|
| | Ex. 1 | Comp. Ex. 1 | Ex. 2A | Comp. Ex. 2 |
| 1st peak | 18.2 | 11.3 | 20.8 | 3.4 |
| 2nd peak | 27.4 | 18.2 | 25.8 | 15.2 |
| 3rd peak | 54.4 | 36.5 | 53.4 | 23.4 |
| $P_I$ | 0 | 0 | 0 | 0 |
| $P_{II}$ | 0 | 0 | 0 | 0 |
| peak of $P_2S_7$ glass | 0 | 0 | 0 | 3.4 |
| peak of $PS_4$ glass | 0 | 34.0 | 0 | 50.1 |
| peak of $P_2S_6$ glass | 0 | 0 | 0 | 4.5 |
| area ratio of the glass-derived peaks ($φ_{glass}$) | 0 | 34.0 | 0 | 58.0 |

Comparative Example 1

(1) Production of Sulfide Solid Electrolyte

Approximately 10 g of the intermediate prepared in (1) of Example 1 was heat-treated at 430° C. for 8 hours to obtain a sulfide solid electrolyte. The conditions of the heat treatment were the same as in (3) of Example 1 except that the retention time was 8 hours.

The $D_{50}$ of the obtained sulfide solid electrolyte was 18.7 μm. σ was 9.8 mS/cm.

(2) Production of Sulfide Solid Electrolyte Particles

The sulfide solid electrolyte obtained in the above (1) was particulated using a jet mill apparatus under the same conditions as in the above (2) of Example 1 to obtain sulfide solid electrolyte particles.

The sulfide solid electrolyte particles were evaluated in the same manner as in Example 1. The evaluation results are shown in Tables 6 and 7. The σ of the sulfide solid electrolyte particles was 1.4 mS/cm.

Figure 5:
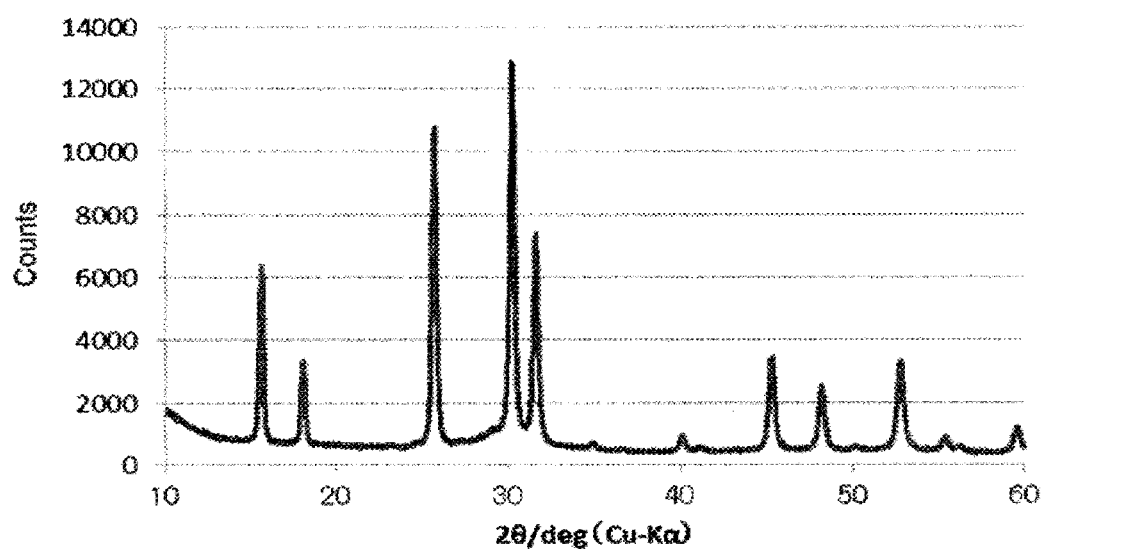
FIG. 5 is an XRD pattern of sulfide solid electrolyte particles of Comparative Example 1.

The XRD pattern of the sulfide solid electrolyte particles is shown in FIG. 5. Peaks derived from the argyrodite-type crystal structure were observed at 2θ=15.60, 18.06, 25.64, 30.16, 31.54, 45.24, 48.16, and 52.74 deg. From FIG. 5, the peak intensity Ip of the diffraction peak A was 12862 (2θ=30.16 deg).

Figure 6:
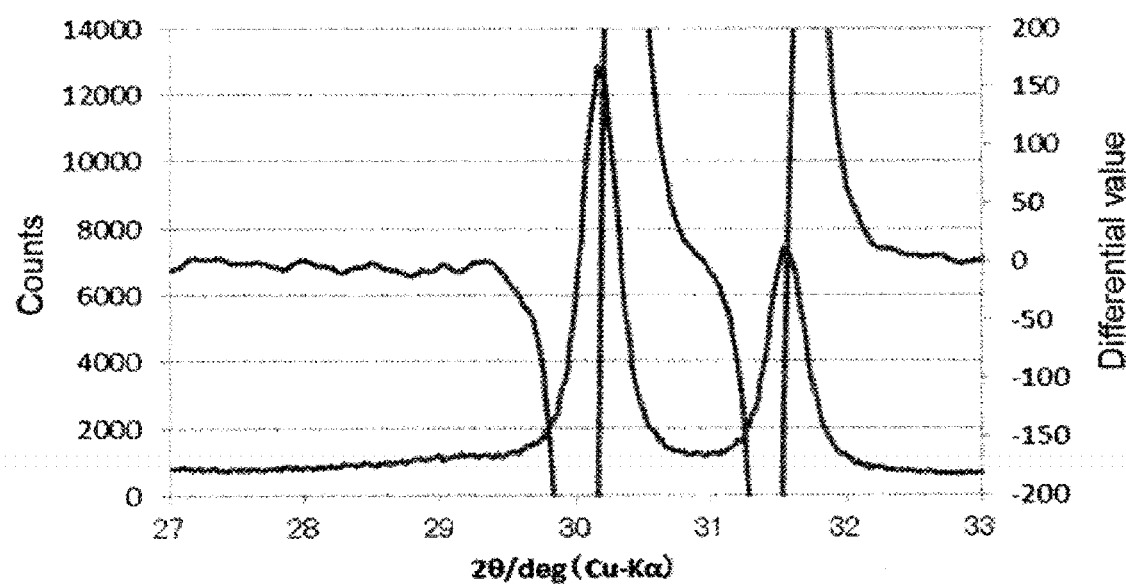
FIG. 6 is a view showing a differential curve of the XRD pattern in an enlarged view around 2θ=27 to 33 deg of the XRD pattern shown in FIG. 5.

FIG. 6 is a view showing a differential curve of the XRD pattern in an enlarged view around 2θ=27 to 33 deg of the XRD pattern shown in FIG. 5. From FIG. 6, the diffraction intensity Ib at a high angle-side low part of the diffraction peak A was 1172 (2θ=30.94 deg).

Figure 7:
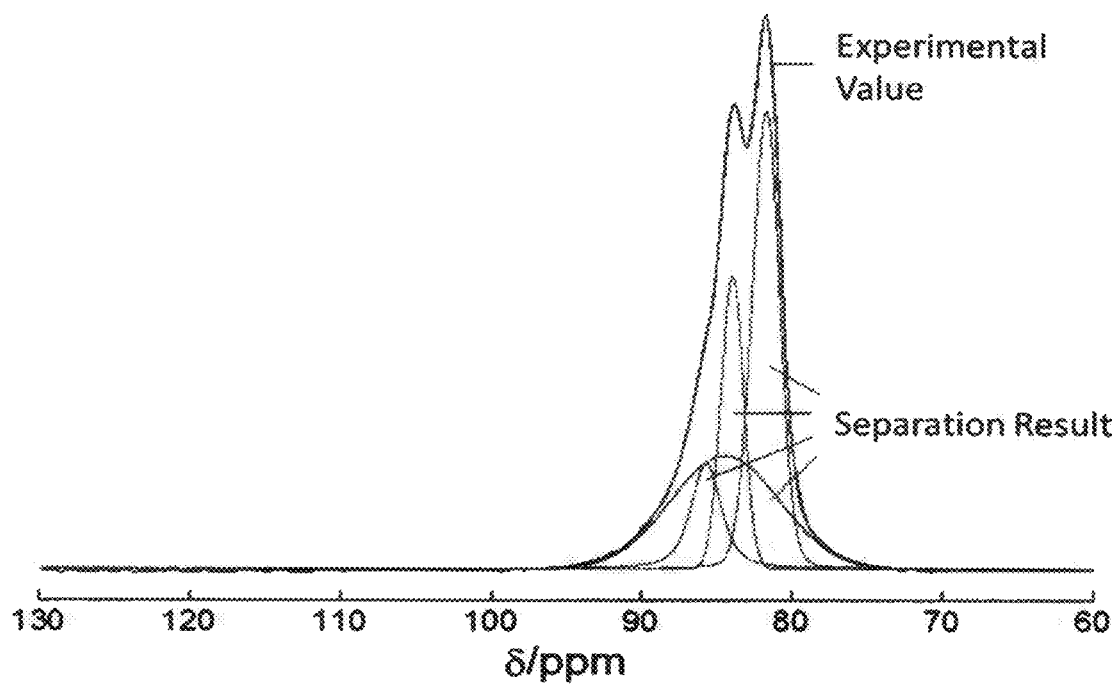
FIG. 7 is a solid $^{31}$P-NMR spectrum of sulfide solid electrolyte particles of Comparative Example 1.

FIG. 7 shows the solid $^{31}$P-NMR spectrum of the sulfide solid electrolyte particles.

As a result of the composition analysis by ICP of the sulfide solid electrolyte particles, the ratio of each element (Li:P:S:Cl) was 5.4:1.0:4.4:1.6.

Example 2A

The sulfide solid electrolyte particles obtained in Comparative Example 1 were heat-treated under the same conditions (430° C., 1 hour) as in (3) of Example 1.

The sulfide solid electrolyte particles after the heat treatment were evaluated in the same manner as in Example 1. The evaluation results are shown in Tables 6 and 7. The $D_{50}$ of the sulfide solid electrolyte particles after the heat treatment was 4.9 μm. σ was 9.6 mS/cm. As a result of the composition analysis by ICP, the ratio of each element (Li:P:S:Cl) was 5.4:1.0:4.4:1.6.

Figure 8:
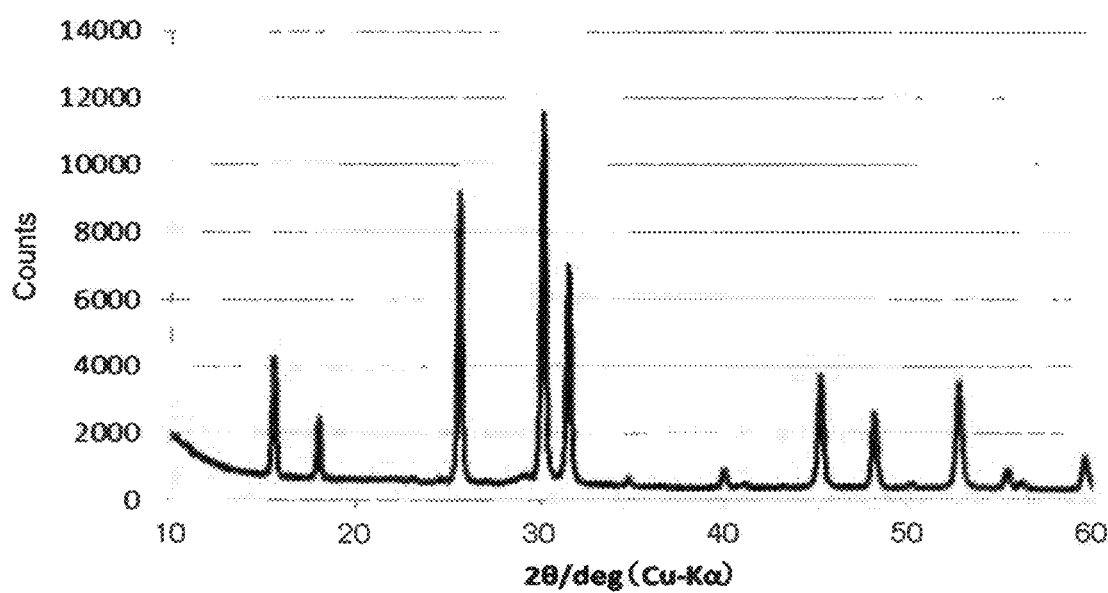
FIG. 8 is an XRD pattern of sulfide solid electrolyte particles of the Example 2A.

The XRD pattern of the sulfide solid electrolyte particles is shown in FIG. 8.

Example 2B

The sulfide solid electrolyte particles obtained in Comparative Example 1 were subjected to heat treatment in the same manner as in (3) of Example 1 except that the heat treatment temperature and time were 420° C. and 30 minutes.

The sulfide solid electrolyte particles after the heat treatment were evaluated in the same manner as in Example 1. The evaluation results are shown in Tables 6 and 7. The $D_{50}$ of the sulfide solid electrolyte particles after the heat treatment was 2.2 μm. σ was 6.1 mS/cm. As a result of the composition analysis by ICP, the ratio of each element (Li:P:S:Cl) was 5.4:1.0:4.4:1.6.

Figure 9:
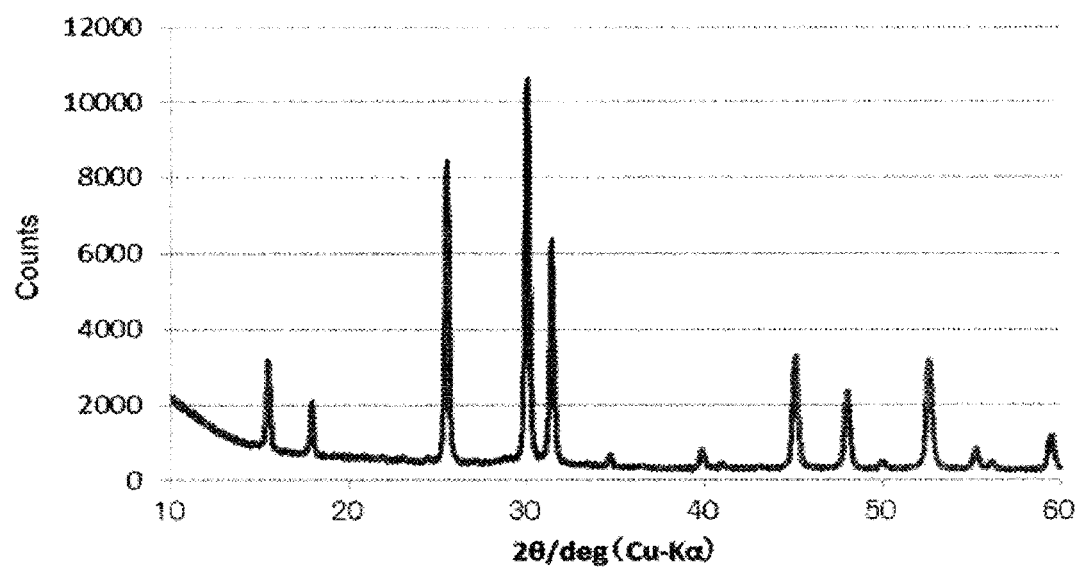
FIG. 9 is an XRD pattern of sulfide solid electrolyte particles of the Example 2B.

The XRD pattern of the sulfide solid electrolyte particles is shown in FIG. 9.

Example 3A (1) Preparation of Sulfide Solid Electrolyte (Intermediate)

The $Li_2S$ produced in Production Example 1, diphosphorus pentasulfide ($P_2S_5$, manufactured by, Sigma-Aldrich Co. LLC), lithium chloride (LiCl, manufactured by Sigma-Aldrich Co. LLC), and lithium bromide (LiBr, manufactured by Sigma-Aldrich Co. LLC) were mixed so as to have a molar ratio (by $Li_2S:P_2S_5$:LiCl:LiBr) of 19:5:10:6 to prepare a mixture of starting materials. An intermediate was prepared in the same manner as in (1) of Example 1 except that the mixture was changed.

(2) Production of Sulfide Solid Electrolyte

Approximately 10 g of the intermediate prepared in the above (1) was heat-treated at 430° C. for 8 hours to obtain a sulfide solid electrolyte. The conditions of the heat treatment were the same as in (3) of Example 1 except that the retention time was 8 hours.

The $D_{50}$ of the sulfide solid electrolyte was 20 μm. σ was 13.0 mS/cm.

(3) Production of Sulfide Solid Electrolyte Particles 40 g of the sulfide solid electrolyte obtained in the above (2) was dispersed in 750 mL of a solvent (dehydrated toluene, Wako Pure Chemical Industries, Ltd.) in a glove box under a nitrogen atmosphere to obtain a slurry of about 5.8% by weight. The solid sulfide electrolyte was particulated by pulverizing the slurry using a bead mill (LMZ015, manufactured by Ashizawa Finetech Ltd.) while maintaining the slurry in a nitrogen-atmosphere. Specifically, 456 g of 0.5 mmφ zirconia beads were used as the grinding medium, and the bead mill apparatus was operated at a peripheral speed of 12 m/sec and a flow rate of 500 mL/min, and the slurry was introduced into the apparatus and passed once. The treated slurry was placed in a nitrogen-substituted Schlenk bottle and dried under reduced pressure to obtain sulfide solid electrolyte particles. The $D_{50}$ of the sulfide solid electrolyte particles was 1.4 μm.

The sulfide solid electrolyte particles were heat treated under the same conditions as in (3) of Example 1.

The sulfide solid electrolyte particles after the heat treatment were evaluated in the same manner as in Example 1. Evaluation results are shown in Table 6. The $D_{50}$ of the sulfide solid electrolyte particles after the heat treatment was 4.4 μm. σ was 10.1 mS/cm. As a result of the composition analysis by ICP, the ratio (Li:P:S:Cl:Br) of each element was 5.4:1.0:4.4:1.0:0.6.

Figure 10:
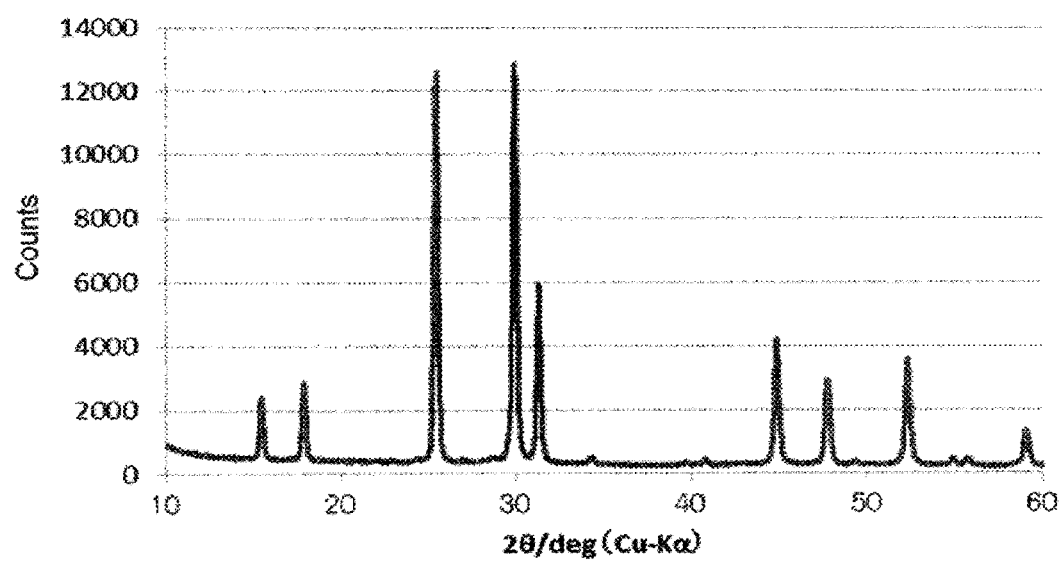
FIG. 10 is an XRD pattern of sulfide solid electrolyte particles of the Example 3A.

The XRD pattern of the sulfide solid electrolyte particles is shown in FIG. 10.

Example 3B

In the heat treatment of (3) of Example 3A, sulfide solid electrolyte particles were obtained in the same manner as in (3) of Example 1, except that the heat treatment temperature and time were at 420° C. for 30 minutes.

The sulfide solid electrolyte particles after the heat treatment were evaluated in the same manner as in Example 1. Evaluation results are shown in Table 6. The $D_{50}$ of the sulfide solid electrolyte particles after the heat treatment was 1.6 μm. Further, σ was 10.3 mS/cm. As a result of the composition analysis by ICP, the ratio of each element (Li:P:S:Cl:Br) was 5.4:1.0:4.4:1.0:0.6.

Figure 11:
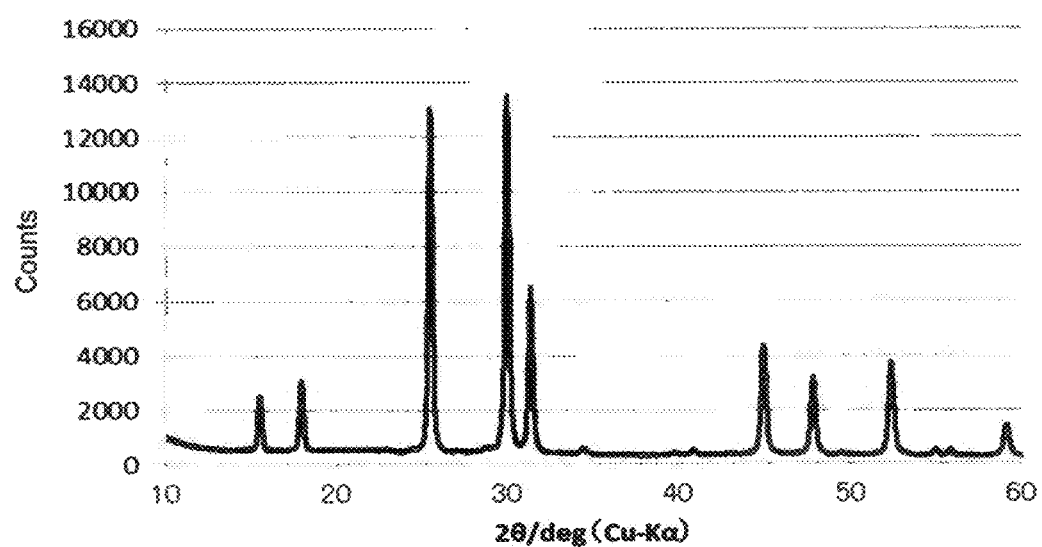
FIG. 11 is an XRD pattern of sulfide solid electrolyte particles of the Example 3B.

The XRD pattern of the sulfide solid electrolyte particles is shown in FIG. 11.

For Examples 2A, 2B, 3A and 3B, the treatment temperatures, the treatment times, the $D_{50}$ and σ of the sulfide solid electrolyte particles obtained in the last heat treatment are shown in Table 8.

Examples 2A and 2B contain only one kind of halogen (Cl). On the other hand, Examples 3A and 3B contain two kinds of halogens (Cl and Br). It is understood that the sulfide solid electrolyte particles having a small $D_{50}$ and a high ionic conductivity can be obtained even when the treatment temperature is lowered and the treatment time is shortened in Example 3 containing two kinds of halogens, as compared with Example 2.

TABLE 8

|  | Ex. 2A | Ex. 2B | Ex. 3A | Ex. 3B |
|---|---|---|---|---|
| heat treatment temperature and time | 430° C. 1 hour | 420° C. 30 minutes | 430° C. 1 hour | 420° C. 30 minutes |
| $D_{50}$ | 4.9 μm | 2.2 μm | 4.4 μm | 1.6 μm |
| σ | 9.6 mS/cm | 6.1 mS/cm | 10.1 mS/cm | 10.3 mS/cm |

Comparative Example 2

(1) Production of Sulfide Solid Electrolyte

Sulfide solid electrolytes were obtained in the same manner as in (1) and (2) of Example 3 above.

(2) Production of Sulfide Solid Electrolyte Particles 1.5 g sulfide solid electrolyte and 30 g of 10 mm-diameter zirconia balls were placed in a planetary ball mill zirconia pot (45 mL) (model number P-7, manufactured by Fritsch GmbH) and fully sealed. The inside of the pot was an argon atmosphere. Sulfide solid electrolyte particles were obtained by processing (mechanical milling) at a rotational speed of 370 rpm in a planetary ball mill for 72 hours.

The sulfide solid electrolyte particles were evaluated in the same manner as in Example 1. The evaluation results are shown in Tables 6 and 7. The σ of the sulfide solid electrolyte particles was 2.8 mS/cm. As a result of the composition analysis by ICP, the ratio of each element (Li:P:S:Cl:Br) was 5.4:1.0:4.4:1.0:0.6.

Example 4

(1) Preparation of Intermediate

The $Li_2S$ produced in Production Example 1, diphosphorus pentasulfide ($P_2S_5$, made of, Sigma-Aldrich Co. LLC), and germanium disulfide ($GeS_2$, manufactured by Kojundo Chemical Laboratory Co., Ltd) were mixed so as to have a molar ratio ($Li_2S:P_2S_5:GeS_2$) of 5:1:1 to prepare a mixture of starting materials. 1.5 g of the mixture and 30 g of 10 mm-diameter zirconia balls were placed in a zirconia pot (45 mL) and fully sealed. The inside of the pot was an argon atmosphere. Two pots were attached to a planetary ball mill (model number P-7, manufactured by Fritsch GmbH) and processed (mechanical milling) at a rotational speed of 370 rpm for 72 hours to obtain an intermediate.

(2) Production of Sulfide Solid Electrolyte 3 g of the intermediate prepared in the above (1) was packed into a Tamman tube (manufactured by Tokyo Garasu Kikai Co., Ltd) in a glove box under an Ar atmosphere, the opening of the Tamman tube was closed with quartz wool, and sealed with an enclosed container made of SUS so as not to enter the atmosphere. The enclosed container was then placed in an electric furnace (FUW243PA, manufactured by Advantech Toyo Kaisha, Ltd) and heat treated. Specifically, the temperature was raised from room temperature to 550° C. at 2.5° C./min, and held at 550° C. for 100 hours. Thereafter, it was gradually cooled to obtain a sulfide solid electrolyte.

(3) Particulatoin of Sulfide Solid Electrolyte 2 g of the sulfide solid electrolyte obtained in (1) above, 7 g of the solvent (dehydrated toluene, Wako Pure Chemical Industries, Ltd.), 1 g of the dispersant (isobutylonitrile, manufactured by KISHIDA CHEMICAL Co., Ltd.), and the $ZrO_2$ balls (diameter: 0.6 mm, 40 g) were loaded into the zirconia pot (45 mL) of the planetary ball mill, and the pot was completely sealed under an Ar atmosphere. The pot was attached to a planetary ball mill (model number P-7, manufactured by Fritsch GmbH) and mechanically milled at 200 revolutions per minute for 20 hours. After completion, the resulting sample was dried on a hot plate at 120° C. for 2 hours to evaporate toluene and isobutyronitrile to obtain sulfide solid electrolyte particles.

(4) Production of Sulfide Solid Electrolyte Particles 1.5 g of the sulfide solid electrolyte particles 1.5 g produced in the above (3) were packed into a Tamman tube (manufactured by Tokyo Garasu Kikai Co., Ltd) in a glove box under an Ar atmosphere, the opening of the Tamman tube was closed with quartz wool, and sealed in an enclosed container made of SUS. The enclosed container was then placed in an electric furnace (FUW243PA, manufactured by Advantech Toyo Kaisha, Ltd.) and heat treated. Specifically, the temperature was raised from room temperature to 530° C. at 2.5° C./min, and held at 530° C. for 1 hour. Thereafter, it was gradually cooled to obtain sulfide solid electrolyte particles.

The sulfide solid electrolyte particles after the heat treatment were evaluated in the same manner as in Example 1. Evaluation results are shown in Table 6. The $D_{50}$ of the sulfide solid electrolyte particles obtained by heat treatment was 4.9 min. σ was 6.8 mS/cm.

In the XRD pattern of the sulfide solid electrolyte particles, peaks derived from LGPS-type crystal structures were observed at 2θ=12.26, 14.28, 20.08, 23.80, 26.82, 29.44, 32.24, 41.36, and 47.30 deg.

The area ratio of the glass-derived peaks of the sulfide solid electrolyte particles calculated from the solid $^{31}$P-NMR measurements was 1.9%.

Comparative Example 3

(1) Production of Sulfide Solid Electrolyte

Sulfide solid electrolytes were obtained in the same manner as in (1) and (2) Example 4 above.

(2) Production of Sulfide Solid Electrolyte Particles 1.5 g of sulfide solid electrolyte and 30 g of 10 mm-diameter zirconia balls were placed in zirconia pot (45 ml) and sealed completely. The inside of the pot was an argon atmosphere. The pot was attached to a planetary ball mill (model number P-7 manufactured by Fritsch GmbH), and processed (mechanical milling) at a rotational speed of 370 rpm for 72 hours to obtain sulfide solid electrolyte particles.

The sulfide solid electrolyte particles were evaluated in the same manner as in Example 1. Evaluation results are shown in Table 6. σ of the sulfide solid electrolyte particles was 1.4 mS/cm.

The area ratio of the glass-derived peaks of the sulfide solid electrolyte particles calculated from the solid $^{31}$P-NMR measurements was 74%.

[Hydrolyzability of Sulfide Solid Electrolyte Particles]

Figure 12:
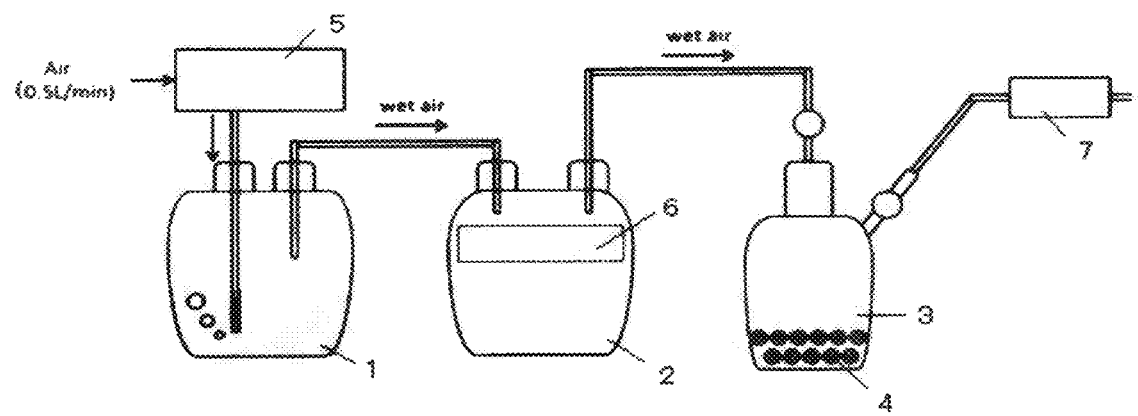
FIG. 12 is an explanatory view of an apparatus used for evaluating the hydrolysis property of sulfide solid electrolyte particles.

The hydrolyzability of the sulfide solid electrolyte particles produced in Examples and Comparative Examples were evaluated using the apparatus shown in FIG. 12. In this device, a flask 1 for humidifying air, a flask 2 having a temperature/humidity meter 6 for measuring the temperature and humidity of humidified air, a Schlenk bottle 3 for charging a measurement sample 4, and a hydrogen sulfide meter 7 for measuring the concentration of hydrogen sulfide contained in the air are connected in this order through a pipe. The evaluation procedure is as follows.

A powder sample prepared by thoroughly pulverizing the sample in a mortar was weighed about 0.1 g in a glow box under a nitrogen atmosphere having a dew point of −80° C., and the powder sample was put into a 100-mL Schlenk bottle 3 and sealed (numbered 4 in FIG. 12).

Air was then flowed into flask 1 at 500 mL/min. The flow rate of air was measured by a flow meter 5. Air was passed through water in the flask 1 and humidified. Subsequently, humidified air was introduced into the flask 2, and the temperature and humidity of the air were measured. Immediately after the start of the circulation, the temperature of the air was 25° C. and the humidity was 80 to 90%. Thereafter, the humidified air was circulated in the Schlenk bottle 3 and brought into contact with the measurement sample 4. The humidified air circulated in the Schlenk bottle 3 was passed through a hydrogen sulfide meter 7 (Model3000RS, manufactured by AMI) to measure the amount of hydrogen sulfide contained in the humidified air. The measurement time was from immediately after the air circulation to 1 hour after the air circulation. The amount of hydrogen sulfide was recorded at intervals of 15 seconds.

The amount of hydrogen sulfide generated per sample 1 g (mL/g) was calculated from the total amount of hydrogen sulfide observed in one hour. Evaluation results are shown in Table 9.

TABLE 9

|  | Ex. 1 | Comp. Ex. 1 | Ex. 2A | Ex. 2B | Ex. 3A | Ex. 3B | Comp. Ex. 2 |
|---|---|---|---|---|---|---|---|
| Amount of hydrogen sulfide generated (mL/g) | 11 | 18 | 10 | 10 | 9 | 9 | 22 |

From Table 9, it can be seen that the sulfide solid electrolyte particles of Example have higher hydrolysis resistance and a smaller amount of hydrogen sulfide generated than Comparative Example.

While embodiments and/or examples of the invention have been described in some detail above, those skilled in the art will readily make many changes to these illustrative embodiments and/or examples without materially departing from the novel teachings and advantages of the invention. Accordingly, many of these modifications are within the scope of the present invention.

The specification of Japanese application(s) on the basis of which the present application claims Paris convention priority are incorporated herein by reference in its entirety.

The invention claimed is:

1. Sulfide solid electrolyte particles, comprising lithium, phosphorus and sulfur,
wherein
a volume-based average particle size measured by laser diffraction particle size distribution measurement is from 0.1 μm to 10 μm,
in powder X-ray diffraction measurement using CuKα ray, the sulfide solid electrolyte particles have a diffraction peak having 2θ of from 29.0 to 31.0 deg,
an intensity ratio (Ib/Ip) of a peak intensity Ib at a high angle-side low part of the diffraction peak to a peak intensity Ip of the diffraction peak is less than 0.09,
the sulfide solid electrolyte particles comprise an argyrodite-type crystal structure, and
the sulfide solid electrolyte particles comprise at least two halogens.

2. The sulfide solid electrolyte particles according to claim 1, wherein the diffraction peak is at 2θ=29.7±0.5 deg.

3. The sulfide solid electrolyte particles according to claim 2, further having a diffraction peak at 2θ=25.2±0.5 deg in powder X-ray diffraction measurement using CuKα ray.

4. The sulfide solid electrolyte particles according to claim 1, wherein a molar ratio of the at least two halogens to the sulfur is from more than 0.23 to less than 0.57.

5. The sulfide solid electrolyte particles according to claim 1, wherein a ratio of an area of glass-derived peaks to a total area of all peaks at 60 ppm to 120 ppm observed in solid $^{31}$P-NMR measurements is from 0% to 30%.

6. An electrode mix comprising the sulfide solid electrolyte particles of claim 1 and an active material.

7. A lithium ion battery comprising the sulfide solid electrolyte particles of claim 1.

8. A lithium ion battery comprising the electrode mix of claim 6.

9. Sulfide solid electrolyte particles, comprising lithium, phosphorus and sulfur,
wherein
a volume-based average particle size measured by laser diffraction particle size distribution measurement is from 0.1 μm to 10 μm,
an ionic conductivity is 4.0 mS/cm or more,
the sulfide solid electrolyte particles comprise an argyrodite-type crystal structure, and
the sulfide solid electrolyte particles comprise at least two halogens.

10. A method for producing sulfide solid electrolyte particles comprising a crystal structure of a stable phase, the method comprising:
pulverizing the sulfide solid electrolyte, followed by subjecting a pulverized product to a heat treatment,
wherein the crystal structure of the stable phase is an argyrodite-type crystal structure, and
the sulfide solid electrolyte particles comprise at least two halogens.

11. The method according to claim 10, wherein the sulfide solid electrolyte comprises lithium, phosphorus, sulfur and halogen, and comprises an argyrodite-type crystal structure.

12. The method according to claim 10, wherein a temperature of the heat treatment is from 350° C. to 700° C.

13. The method according to claim 10, wherein a jet mill, a ball mill or a bead mill is used for the pulverizing.

14. The method according to claim 10, further comprising:
reacting a raw material comprising lithium, phosphorus and sulfur, thereby producing a glassy sulfide solid electrolyte.

15. The method according to claim 14, wherein the raw material comprises lithium sulfide, phosphorus sulfide, and lithium halide.

* * * * *